(12) United States Patent
Rubin

(10) Patent No.: US 7,394,723 B2
(45) Date of Patent: Jul. 1, 2008

(54) ATMOSPHERIC TURBULENCE HAZARD DETECTOR

(76) Inventor: William L. Rubin, 166-47 16th Ave., Whitestone, NY (US) 11357

( * ) Notice: Subject to any disclaimer, the term of this patent is extended or adjusted under 35 U.S.C. 154(b) by 61 days.

(21) Appl. No.: 10/574,991

(22) PCT Filed: Sep. 15, 2004

(86) PCT No.: PCT/US2004/030170

§ 371 (c)(1),
(2), (4) Date: Apr. 8, 2006

(87) PCT Pub. No.: WO2005/045359

PCT Pub. Date: May 19, 2005

(65) Prior Publication Data

US 2007/0104026 A1  May 10, 2007

Related U.S. Application Data

(60) Provisional application No. 60/503,927, filed on Sep. 17, 2003.

(51) Int. Cl.
*G01W 1/10* (2006.01)
(52) U.S. Cl. .................................................. 367/13
(58) Field of Classification Search .................. 367/13; 73/170.16

See application file for complete search history.

(56) References Cited

U.S. PATENT DOCUMENTS

| | | | | | |
|---|---|---|---|---|---|
| 4,012,713 | A | * | 3/1977 | Greene et al. | 73/178 R |
| 4,359,640 | A | * | 11/1982 | Geiger | 250/372 |
| 5,355,350 | A | * | 10/1994 | Bass et al. | 367/13 |
| 6,097,296 | A | * | 8/2000 | Garza et al. | 73/170.16 |
| 6,480,142 | B1 | * | 11/2002 | Rubin | 342/26 R |
| 7,200,418 | B2 | * | 4/2007 | Kaikuranta et al. | 455/556.1 |
| 2005/0197070 | A1 | * | 9/2005 | Kaikuranta et al. | 455/67.13 |
| 2007/0104026 | A1 | * | 5/2007 | Rubin | 367/13 |

* cited by examiner

*Primary Examiner*—Dan Pihulic
(74) *Attorney, Agent, or Firm*—Seymour Levine

(57) ABSTRACT

An Atmospheric Turbulence Detector utilizes a sensor to detect noise and extracts infrasound having frequencies below a specified infrasound frequency. A threshold is computed from the detection of infrasound in the vicinity of the sensor prior to the arrival of infrasound from the turbulence and an alarm is given when the infrasound from the turbulence are determined with the utilization of two sensors (6-1A, 6-1B), measuring amplitude differences of the infrasound detected at two seperate locations.

36 Claims, 12 Drawing Sheets

ATMOSPHERIC TURBULENCE HAZARD DETECTOR

The priority benefit of Provisional Application No. 60/503,927 filed Sep. 17, 2003 is claimed by this application.

BACKGROUND OF THE INVENTION

1. Field of the Invention

The invention relates generally to the detection of hazardous atmospheric turbulence, and more particularly to the detection of aircraft wake vortices, microbursts, and tornadoes near the ground, and Clear Air Turbulence (CAT) at high altitude.

2. Description of the Prior Art

Hazardous Turbulence Detection: Clear air turbulence, microbursts, aircraft wake vortices, gust fronts, thunderstorms, updrafts, downdrafts, and convective flows all present severe hazards to aircraft. Effects on aircraft encountering any of these hazards range from severe buffeting to the ultimate catastrophe. A system for detecting such hazards is disclosed in U.S. Pat. No. 6,480,142 issued to W. L. Rubin. Hazardous turbulence is detected with the utilization of Doppler shifted frequencies of received radar signals backscattered from sound generated by atmospheric turbulent flows. The radiated radar signals are generally within the UHF or microwave bands. Resulting Doppler frequency bandwidths are used to establish the parameters of the sound emitted by the, hazardous turbulence. Radar reflections are strongest when the acoustic wavelength of the sound is one half the radar wavelength (Bragg effect). The corresponding acoustic frequencies that maximize reflection from UHF and microwave radar fall between 1 kHz and 20 kHz. As will be shown, turbulence generated sound is strongest in the infrasound band below 20 Hz and decreases approximately 6 dB per octave above 50 Hz. Consequently, acoustic reflections are weak for UHF and microwave radar, resulting in short detection ranges.

Wake Vortex Detection: Aircraft generate multiple invisible vortices in their wake as a consequence of lift. The vortices quickly combine to form a pair of primary vortices that are separated by three-quarters of a wingspan. The primary vortices descend after formation and diverge as they approach a height above the ground approximately equal to one-half of their initial separation. Upon reaching this height, the vortices move in opposite directions in calm winds at a speed of 1 to 2 meters per second. A strong crosswind moves both vortices in the same direction at slightly different speeds.

Vortices produced by large and heavy aircraft are hazardous to smaller aircraft since they can induce rolling moments that exceed the smaller aircraft's roll control authority, causing a dangerous loss of altitude, and possible structural failure. Vortex encounters are especially hazardous in the terminal area where light aircraft follow heavy aircraft on the same glide slope and where recovery from an upset may not be possible because of low aircraft altitude.

To minimize wake vortex encounters, the Federal Aviation Administration (FAA) imposes 3 to 6 mile spacing between leader and follower aircraft based on relative aircraft weight categories. Because a strong crosswind moves wake vortices out of the glide path fairly quickly, FAA spacings are overly conservative most of the time. The FAA has projected airline savings of billions of dollars per year if mandated spacings could be safely reduced. Systems have been proposed to adjust aircraft spacing based on vortex duration in the glide slope. Such systems require a real-time vortex sensor.

A Ground Wind Vortex Sensing System (GWVSS) has been developed to determine vortex duration. This system utilizes a row of pole-mounted anemometers perpendicular to the arrival glide slope for detecting the air flow generated by wake vortices as they move away from the glide slope. Each anemometer is mechanically connected to a DC generator, the voltage of which is proportional to the rotational rate of the anemometer. This output voltage is coupled to a graph-like display in which anemometer positions are located along the bottom of the display. A data point above each anemometer position is deflected upward by an amount proportional to the amplitude of the corresponding generator output voltage. A curve is passed through the vertically deflected points. The location of vortices with respect to individual anemometers can be deduced from the shape of the curve. GWVSS, however, is not operationally deployed because poles are not permitted near airport glide slopes for safety reasons.

Another wake vortex detector of the prior art is a horizontally pointing Radar Acoustic Sensing System (RASS). Such a system has detected, tracked, and measured the strength of wake vortices under all weather conditions. RASS radiates overlapping radar and acoustic beams. Because the air's index of refraction is a function of density, the RASS acoustic beam, which consists of a spatial pattern of condensations and rarefactions, generates in situ refractive index variations. Radar waves reflect from these index variations. As previously stated, radar reflections are strongest when the acoustic wavelength is half the radar wavelength. The reflections focus back onto the radar antenna because the radar and acoustic beams have overlapping spherical wavefronts. Radar reflections are Doppler shifted by an amount corresponding to the instantaneous speed of sound. Because a vortex's circular flow speeds up and slows down different parts of a RASS acoustic wave as it passes through the vortex, the radar Doppler spectrum is a mapping of the vortex's line-of-sight velocity distribution. Vortex circulation (vorticity) is deduced from the Doppler spectrum. RASS, however, emits a loud annoying sound, is costly, and expensive to maintain.

Wake vortices radiate audible sounds. These sounds have been recorded 6 and 12 seconds after aircraft passage by a ground-based, vertically pointing 64-element microphone array. A system, having the acronym SOCRATES (Sensor for Optically Characterizing Ring-Eddy Atmospheric Turbulence Emanating Sound), for detecting this sound utilizes a laser-based, opto-acoustic technique to emulate a large array of microphones. SOCRATES has detected sound generated by wake vortices, but not consistently.

Microburst Detection: A microburst is a small-scale, short-lived, intense downdraft produced by cool dense air descending from the base of a convective cloud. When the downdraft reaches the ground, it generates an outburst of damaging wind flow. Microbursts are invisible and can occur anywhere. Nicrobursts typically last less than 10 minutes and are hazardous to aircraft during takeoff and landing.

Winds traveling outward from the touchdown area have an inverted mushroom shape about 5 miles in diameter and 300 to 500 feet high. Outward wind speeds can be as high as 168 mph and vary with height above the ground. There are two types of microbursts—wet and dry. The distinguishing feature between the two is the prevailing environment in which they are produced.

A system, in the prior art, positioned on board an aircraft for detecting microbursts that measures aircraft ground speed and compares it to the air speed of the aircraft is disclosed in U.S. Patent issued to L. M. Green, et al. The difference in speeds is an indication of wind conditions about the aircraft. This system, however, determines the existence of a microburst in the vicinity of the aircraft and does not provide a timely waning for the avoidance of the microburst.

Another method in the prior art, LLWAS (Low Level Windshear Alert System), consists of a centrally located wind sensor and about 12 additional wind sensors located around the airport. A software algorithm detects and measures wind shear based on wind measurements. LLWAS, however, has poor spatial resolution along the arrival glide slope and departure corridor, thereby allowing many microbursts to escape detection.

Still another system in the prior art is the Terminal Doppler Weather Radar (TDWR) a ground based system which detects microburst wind shear in the vicinity of an airport. TDWR, however, detects only radial wind shear relative to its location.

Additionally, its horizontal antenna beams receive strong ground clutter return that reduces wind shear detectability and decreases measurement accuracy. Further, TDWR detects only wet microbursts, it cannot detect dry microbursts.

Tornado Detection: A tornado is a funnel-shaped, swirling turbulent flow having a top that is connected to an overhead thunderstorm cloud and a bottom that is in contact with the ground. Tornados have internal winds that range from 40 to 300 miles per hour and diameters near the funnel bottom that are typically 1000 feet. A tornado travels at an average speed of 25 to 40 miles per hour over an average path length of 4 miles and emits sound over a wide band of frequencies including very low frequency sounds known as infrasound. Tornado damage results from the high internal wind velocities and wind-blown debris. Tornadoes are nearly invisible, marked only by swirling debris at the base of the funnel.

The National Weather Service utilizes radar to identify conditions conducive to the formation of a tornado and issues tornado watches and warnings, which typically average less than 20 minutes, over the broadcast media. This radar detects about 50% of the tornadoes in the Rocly Mountain high plains and about 25% of the tornadoes in the high plains. The relatively low detection rate results from the fact that multiple radar signatures must be simultaneously identified in order to detect atmospheric conditions conducive to tornado formation.

Radar resolution limits the specificity of tornado warnings to several hundred square miles. As a result, National Weather Service warnings mostly serve to heighten people's awareness in the affected area to look for visual and aural signs of an approaching tornado. In these circumstances the chance to reach shelter may have already passed by the time a tornado is sighted.

Other tornado warning devices rely on the detection of electromagnetic, pressure, and acoustic signatures. Electromagnetic signatures are generated by the thunderstorm spawning the tornado. Since all thunderstorms do not generate tornadoes, this method has a high false alarm rate. Devices utilizing low barometric pressure also have high false alarm rates since low pressure may result from an approaching storm having moderate winds. Both methods provide short warning times and no information about tornado distance.

Numerous tornado warning systems have been devised that rely on detecting sound generated by tornadoes. One such system, disclosed in U.S. Pat. No. 5,355,350 issued to H. E. Bass, et al, monitors outdoor noise between 180 and 420 Hz. When the monitored sound intensity exceeds established thresholds, logic is applied to determine whether the level is increasing at a rate indicative of an approaching tornado and therefore whether an alarm should be sounded. This system, because sound in the selected passband is significantly attenuated by the atmosphere, detects tornadoes to a distance of only one-half mile and consequently, provides warning times of only 30 to 60 seconds. This method also does not provide range to the tornado.

Another system for providing tornado warnings is disclosed in U.S. Pat. No. 6,097,296, issued to S. Garza, et al. In this system a narrow pass band acoustic filter is provided which is centered at one Hertz and designed to attenuate signals that are greater than and less than one hertz. In essence the filter has a near zero bandwidth. The wave emanating from this filter is clipped both at the peaks and valleys to obtain a wave that is substantially square. The square wave is coupled to a counter wherein the number of square wave cycles are counted. An alarm sounds when the counter reaches a predetermined number of cycles.

This system is very difficult to implement. A filter that passes only one frequency, if possible, is extremely difficult to design. Further, a filter centered at 1 Hz may not be optimum. The shape of a tornado's infrasound spectrum depends on internal wind speeds and tornado size, giving rise to infrasounds over a bandwidth that may not include one Hertz or may peak at some other frequency. Should the system be operable as described, it would be of limited utility since it does not provide range to the tornado and a concomitant warning time.

CAT Detection: CAT is produced by high altitude atmospheric flows having speeds of 100 to 200 knots. CAT is often hundreds of miles long, tens of miles wide, and thousands of feet high and cannot be seen or avoided by pilots without prior knowledge of its location. NASA has estimated that airlines encounter CAT about 9 times a month, resulting in 24 injuries, principally to flight attendants. Costs due to CAT exceed $100 million a year. These costs include aircraft repair and downtime, flight attendant injuries and time lost, and passenger injuries.

Radar cannot detect CAT because it is composed of clear air which does not contain reflecting aerosols. A system known as LIAR, operating in the intra band, is currently being assessed for its ability to detect CAT. An experimental LIAR system, however, has generated CAT warnings of only a few seconds. As presently configured, LIAR's high cost, size, and weight, in addition to its poor performance to date, make it unattractive for onboard CAT detection.

SUMMARY OF THE INVENTION

An object of the present invention is ground-based detection of wake vortices in the vicinity of airport arrival and departure glide slopes.

A second object is ground-based detection of microbursts in the vicinity of airport arrival and departure glide slopes.

A third object of the invention is early ground-based detection of approaching tornadoes.

A fourth object of the invention is early onboard detection of hazardous CAT at altitude, and also microbursts during landing and takeoff.

All of the objects of the above are achieved by detecting the infrasound radiated by each of the above turbulent flows, determining the infrasound spectral parameters, and processing the determined infrasound spectral parameters.

BRIEF DESCRIPTION OF THE DRAWINGS

The foregoing objects and advantages will become more fully understood from the Description of the Preferred Embodiments with reference to the drawings wherein.

DESCRIPTION OF THE PREFERRED EMBODIMENTS

Figure 1:
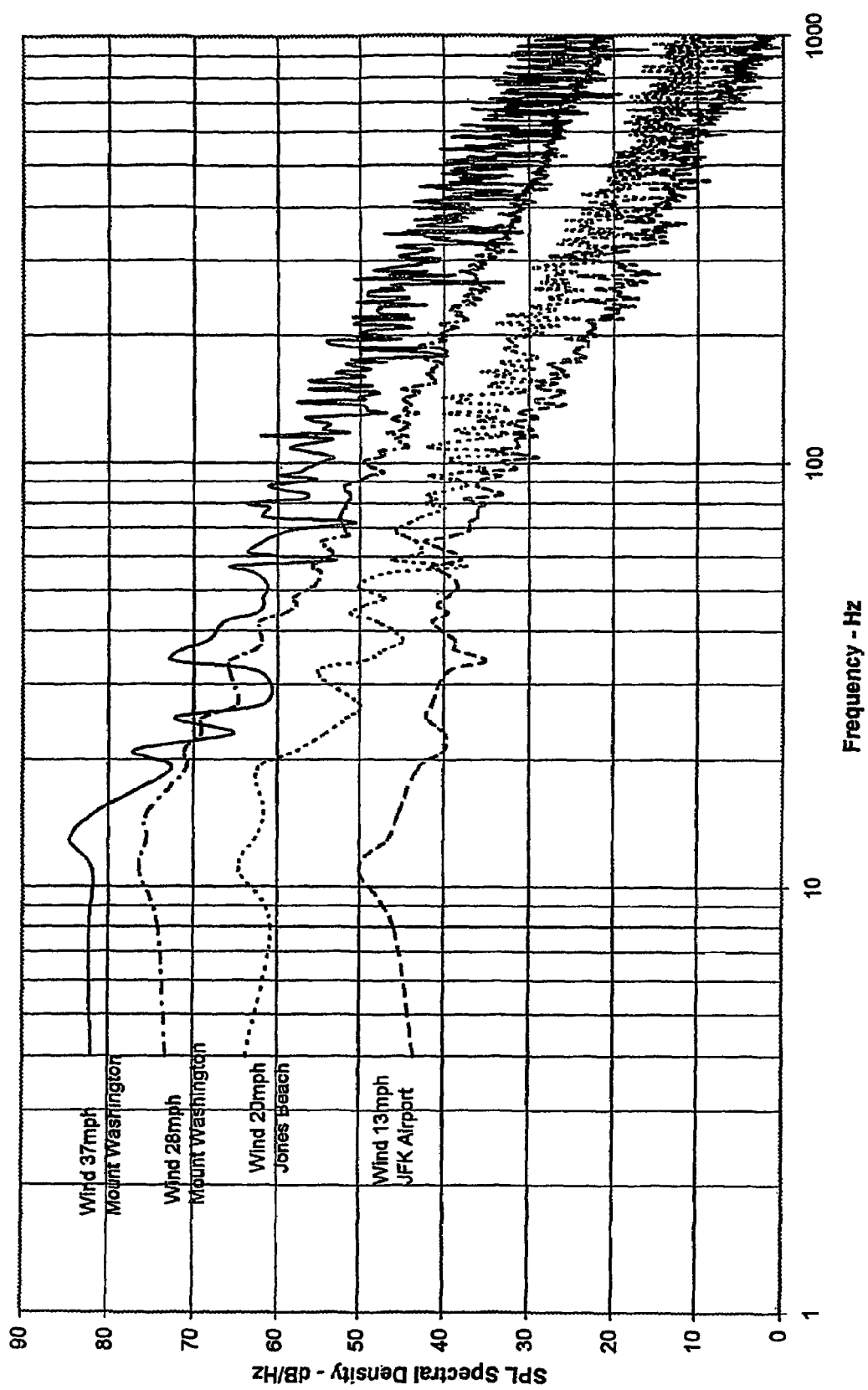
FIG. 1 shows sound spectra of wind generated sound for four wind speeds.

A flow is laminar or turbulent depending on the value of its Reynolds number Re, which is given by Re=UL/v, where L is a characteristic length of the flow, U is a characteristic speed of the flow, and v is the fluid kinematic coefficient of viscosity. When the Reynolds number is below a critical value, the fluid viscosity causes an averaging of the lateral velocity variations, and laminar flow is favored.

As the Reynolds number increases above a critical value, the flow becomes unstable so that a small disturbance produces irregular eddying motion. The largest scale eddies appear first. These eddies are also unstable due to having high Reynolds numbers and break down into smaller second order eddies. Second order eddies generally also have high Reynolds numbers and break down into smaller third order eddies. This process continues until eddies with Reynolds numbers below a critical value are reached. These eddies dissipate, their energy expended overcoming frictional forces. The largest scale eddies draw their energy from the motion of the flow. Successive eddies draw their energy from larger scale eddies and transfer their energy to smaller scale eddies. Fully developed turbulence consists of overlapping, fluctuating eddies of varying characteristic scales.

The largest scale eddies are of the same order as the length scales of the flow and fluctuate the most. The largest scale eddies are inhomogeneous and anisotropic almost to the same extent to which the flow field is inhomogeneous and anisotropic. Since the energy transfer to smaller scale eddies is random, the effects of flow anisotropy and inhomogeneity on the statistical state of smaller scale eddies diminish with scale so that smaller scale turbulence becomes increasingly homogeneous and isotropic.

In a free flow there can be no change in total vorticity. Therefore, a vorticity change in one location must be accompanied by an equal and opposite vorticity change elsewhere in the flow. It has been shown that vorticity acceleration results in the generation of sound. Because the largest scale eddies have the greatest vorticity and also the largest fluctuations, they generate the largest vorticity acceleration and the highest intensity sound. The frequency of aerodynamically generated sound is inversely related to eddy scale size so that the low frequency end of the sound spectrum has the highest amplitude. The spectral shape of the low end of the spectrum depends on the distribution of the largest scale eddies and hence on flow characteristics.

It has also been shown that in the case of isotropic turbulence the distribution of eddy wave numbers k in the inertial range is proportional to $(k^{-5/3})$. It follows that sound intensity produced by eddies in the inertial range is proportional to $(f^{-5/3})$. This is equivalent to a sound intensity decrease of 5.5 dB per octave for increasing frequency. As mentioned above, smaller scale turbulence becomes increasingly homogeneous and isotropic, so that sound intensity above the low frequency end of the turbulence generated sound spectrum would be expected to decrease 5.5 dB per octave.

Further, it has been shown that the total sound power generated by a free turbulent flow is proportional to the eighth power of the flow velocity.

Summarizing and placing the preceding description in perspective, free flows with high Reynolds numbers generate turbulence consisting of overlapping fluctuating eddies having varying characteristic scales. Eddy fluctuations produce vorticity acceleration that in turn generates sound. Sound radiated by a turbulent flow is highest at the low frequency end of the turbulence generated spectrum and decreases about 5.5 dB per octave at higher frequencies. Total sound power is proportional to the eighth power of the velocity of a free turbulent flow.

All atmospheric flows have high Reynolds numbers, are turbulent, and radiate sound. Measurements by the inventor indicate that the sound generated by a flow near the ground is slightly stronger than sound produced by flow away from the ground, because eddy interactions with the ground generate higher vorticity acceleration. Other measurements, described below, show that wind generates sound which is strongest at frequencies well below the human hearing range, that is, in the infrasound band. Infrasound is unaffected by atmospheric attenuation.

FIG. 1 shows sound pressure level (SPL) generated by atmospheric wind for four wind speeds as a function of frequency. These plots are typical of measurements made by the inventor over at Mount Washington (N.H.), Jones Beach (N.Y.), and Kennedy International Airport. Instumentation limited the lowest plotted frequency to 4 Hz. The 37 mph and 28 mph wind spectra were obtained from sound recordings made on top of Mount Washington. The 20 mph wind spectrum was obtained from sound recorded at Jones Beach (N.Y.) in 2002. The 13 mph wind spectrum was obtained from recordings at JFK Airport.

FIG. 1 shows that the highest sound intensity produced by atmospheric wind occurs below 20 Hz. If a spectrum's corner frequency is defined by the intersection of the average falloff slope of frequencies between 50 Hz and 1000 Hz with a horizontal line approximating spectral amplitude between 4 and 10 Hz, it is evident from FIG. 2 that the corner frequency shifts towards lower acoustic frequencies with increasing wind speed. This suggests that the population of the largest eddies in wind flow increases with increasing wind speed, resulting in a spectral shift of peak sound intensity to lower acoustic frequencies. The figure shows that each wind sound spectrum decreases about 6 dB/octave in the audible band and that the intensity of sound below 20 Hz is roughly proportional to the eighth power of the wind speed.

The relatively high infrasound intensity at low frequencies for modest wind speeds shown in FIG. 1 implies that an infrasound sensor can detect high speed hazardous turbulence at long ranges, for example, thunderstorms and hurricanes. However, both of these hazardous turbulences are heavily laden with moisture, making them easily detectable by radar. Infrasound sensing is particularly useful for long range detection of clear air hazardous turbulence, which is normally difficult to detect by other means. CAT, microbursts, tornadoes, and aircraft wake vortices are examples of clear air hazardous high speed flows that are difficult to detect by other means.

CAT flows are free, while microburst, tornado, and wake vortex flows are generally free except near the ground. As mentioned above, turbulent flows within a few hundred feet of the ground generate slightly stronger sound than flow above the ground, enhancing detectability.

Figure 2:
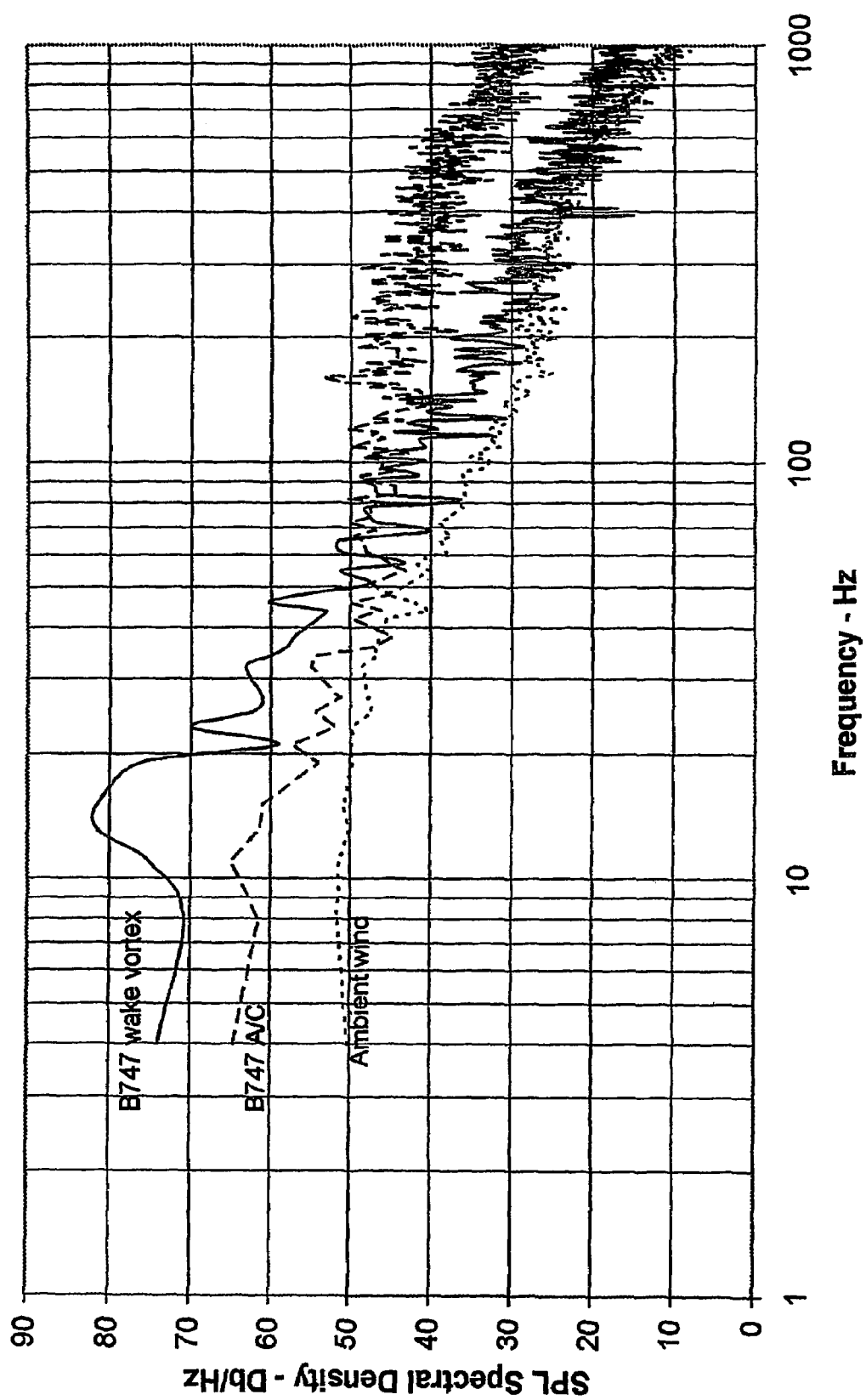
FIG. 2 shows sound spectra generated by a B747 wake vortex, B747 aircraft, and airport ambient wind.

Wake Vortices: Sound generated by wake vortices were recorded by the inventor at JFK International Airport at a location 400 feet from the glide slope of a runway near the glide slope middle marker. Sample sound spectra of these recordings are shown in FIG. 2 for (1) a B747 vortex in ground effect (2) B747 aircraft noise, and (3) ambient wind noise. As shown in the figure, the wake vortex spectrum exhibits a pronounced infrasonic peak between 10 and 20 Hz which was also seen in the case of vortex spectra of other aircraft. At higher frequencies the wake vortex spectrum and the wind spectrum decrease at similar rates, about 6 dB per octave, while the B747 aircraft noise spectrum decreases more slowly. It is evident from FIG. 2 that the wake vortex sound is stronger than the B747 aircraft noise as well as the wind noise in the infrasound band. This was also observed on sound spectra obtained for other aircraft. Sound recordings made during aircraft landings using a single microphone, that were filtered to eliminate sound above the infrasound band, show that wake vortex presence is straightforwardly detected by this means.

Figure 2A:
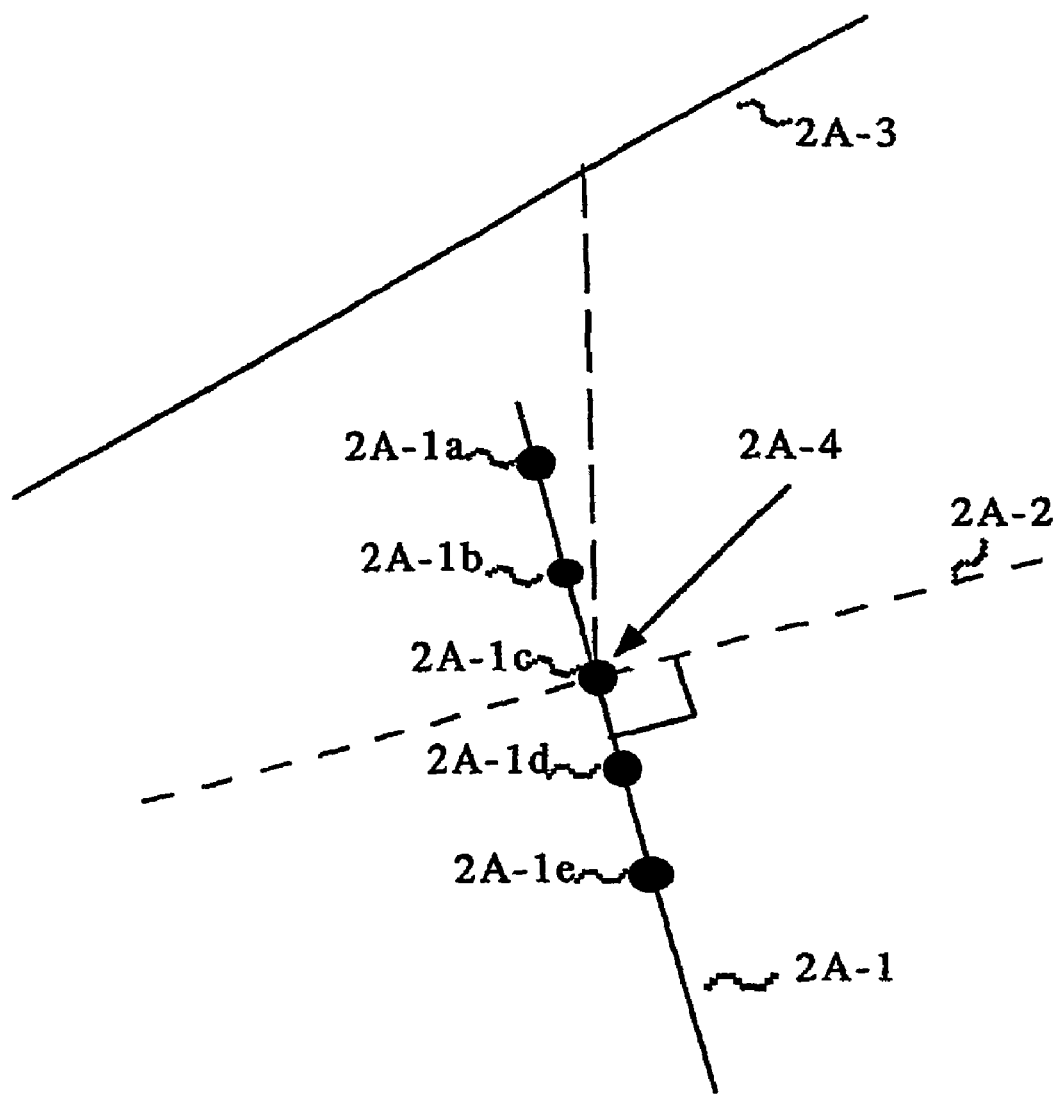
FIG. 2A is a representation of the positioning of microphones at the middle marker of a glide slope.

Referring to FIG. 2A: Sensors for detecting wake vortices produced by arriving aircraft may be positioned in a row 2A-1 that is perpendicular to foot print 2A-2 of the glide slope 2A-3 at approximately the middle marker 2A-4, the position at which the elevation of the glide slope is approximately 200 feet, as shown in FIG. 2A. These sensors may be infrasound detecting microphones 2A-1$a$ through 2A-1$e$ spaced approximately 200 feet apart. The number and spacing of the microphones are not critical to the detection of a wake vortex The low frequency response of each microphone is similar to that of Bruel and Kjaer (B&K) microphone Type 4193, which detects sound down to 0.1 Hz. To eliminate wind contact and provide rain protection, each microphone may be covered with a permanent outdoor windscreen and rain cover that is similar to those for B&K microphone 4193. Each microphone is coupled to an associated wake vortex detector, thereby providing independent wake vortex detection systems. Using a multiplicity of sensors at the middle marker, or at any other appropriate location, provides a wake vortex tracking system that gives the location of a wake vortex as it moves away from the glide slope 2A-3. If only the existence of a wake vortex in the vicinity of a glide slope is of interest, a lesser number of microphones and their associated vortex detection system may be employed.

Figure 3:
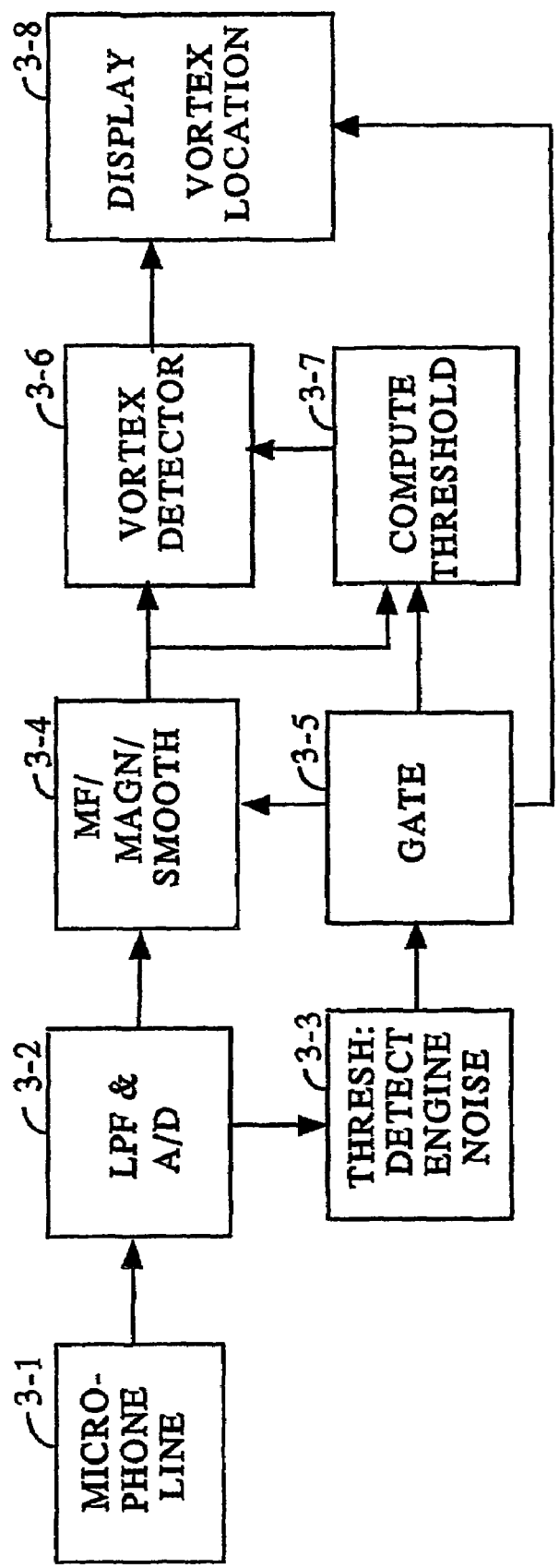
FIG. 3 is a block diagram of a preferred embodiment of the invention for ground-based detection and location of wake vortices at an airport.

Refer now to FIG. 3. The signal generated by each microphone in the microphone line 3-1 is coupled to low pass filter and analog-to-digital (A/D) converter 3-2 wherein an analog low pass filter sharply attenuates frequencies above 200 Hz. The resulting analog signal may be converted to digital format at a 500 Hz rate, a rate which satisfies the Nyquist criterion. The digital signal at the output terminal of the low pass filter and A/D converter 3-2 is coupled to a matched filter/ amplitude detector/amplitude smoother 3-4, wherein it passes through a digital matched filter approximately matched to a typical vortex infrasound spectra below 20 Hz to optimize vortex infrasound detection in the presence of white Gaussian noise. Such a matched filter also sharply attenuates sound above 20 Hz, thereby eliminating most aircraft, airport, and rain noise. The matched filter output is magnitude detected and smoothed over for a period of 1 to 2 seconds to reduce sound spikes produced by wind gusts.

Filtered signals from the microphone 2A-1$c$ directly under the glide slope are coupled to an engine noise threshold detector 3-3 wherein the signals are compared to a threshold that is set to be exceeded only by noise from an aircraft passing directly overhead. When the threshold is exceeded, a signal from the threshold detector 3-3 opens gate 3-5 wherefrom signals are provided to activate the matched filter 3-4, a threshold computer 3-7, and, at a subsequent time, as for example ten seconds later, a display unit 3-8. Gate 3-5 automatically closes at a preselected time after opening, as for example three minutes after opening. Three minutes is the longest period of time over which vortices are hazardous. Should another aircraft arrive before the 3 minutes have elapsed, threshold detector 3-3 refreshes the gate timer and the gate remains open for three minutes from the time the second aircraft is detected and processing continues as discussed.

Signals at the output terminals of the matched filter 3-4 are coupled to a wake vortex detector 3-6 and to the threshold computer 3-7. Threshold computer 3-7 computes a threshold by averaging the infrasound magnitude generated by the passing aircraft as obtained from the matched filter 3-4. This averaging is performed over a 10 second time period that begins immediately after the gate 3-5 is opened. The threshold is set by the threshold computer 3-7 at a value that is 20 dB lower than the measured average magnitude. This set threshold is coupled to the vortex detector 3-6, wherein signal magnitudes coupled from the matched filter 3-4 are continuously compared to the set threshold.

After the display unit 3-8 is activated, signal magnitudes coupled to the vortex detector 3-6 that exceed the set threshold are coupled thereto. The display on the display unit 3-8 has a graph-like appearance. Microphone positions are located along the bottom of the display and a vertical bar appears above each microphone position, the height of which is proportional to the corresponding measured infrasound magnitude. The approximate location of each vortex may be inferred by interpolating between vertical bar heights. When all five bar heights remain below a predetermined value for a pre-selected time period, hazardous vortices are deemed absent within 400 feet of the runway center line around the middle marker. Display unit 3-8 is active only during the period of time that the gate 3-5 is open, it is turned off when the gate 3-5 closes. It should be recognized that the microphones need not be centered on the glide slope and their positioning is not limited to the middle marker.

Figure 3A:
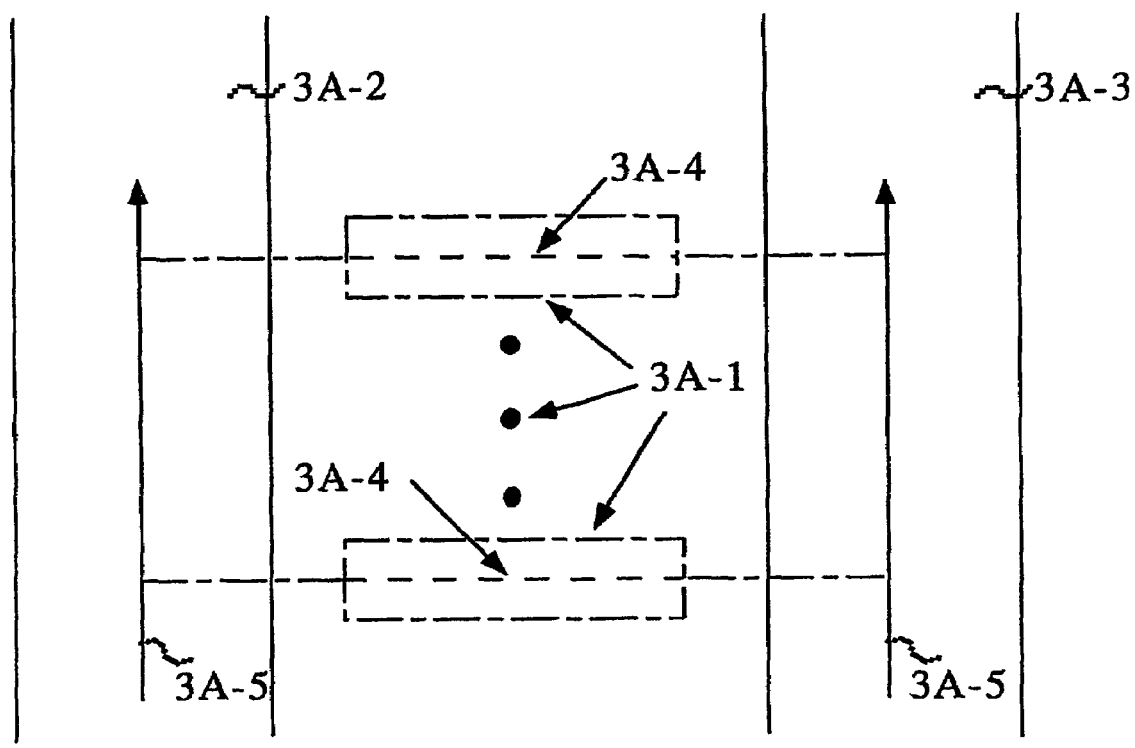
FIG. 3A is a diagram indicating the position of microphone rows between parallel runways.

The FAA, in addition to imposing constraints between arrival times on a runway, also imposes time spacing constraints between aircraft arriving on parallel runways less than 2500 feet part in order to prevent aircraft encounters with vortices that travel from one runway to the other. Refer now FIG. 3A. To monitor the existence of wake vortices between runways, parallel rows of microphones 3A-1 may be positioned between the two parallel runways 3A-2,3A-3, with the longitudinal center line 3A-4 of each row perpendicular to the runway direction 3A-5, that detect and track vortices crossing from one runway to the other. Each row may have 3 microphones. This number is not limiting, any number of microphones may be included in a row. Signal processing of the infrasound signals sensed by the microphones between the runways is similar to that previously described.

Figure 3B:
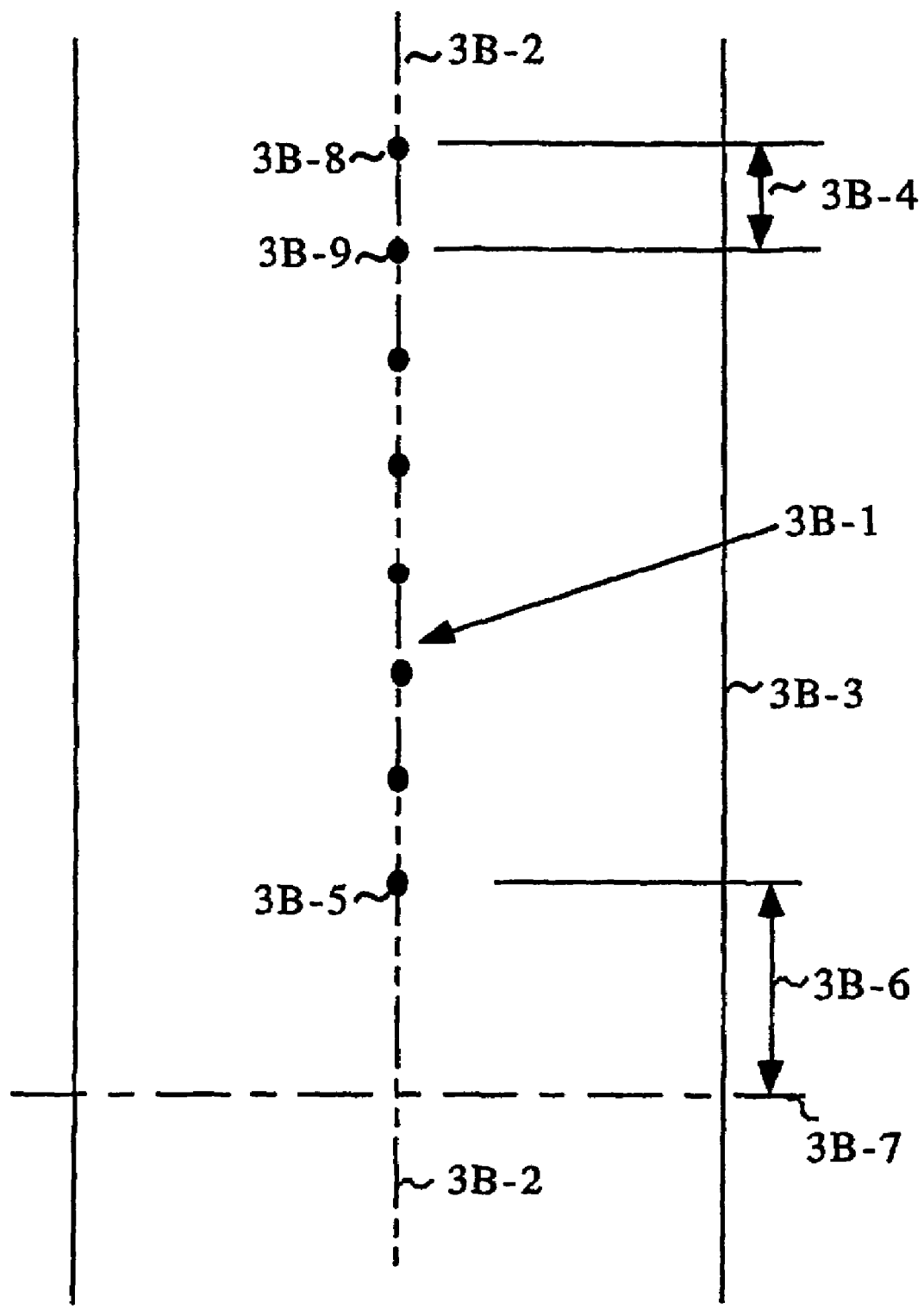
FIG. 3B is a diagram indicating the position of microphones in a column along the center line of a runway.

Because departing aircraft climb rapidly and liftoff points along the runway vary greatly for different aircraft weight categories, a variation of the microphone positioning and the signal processing is needed for detection of wake vortices generated by departing aircraft. For departing aircraft, a 400 feet wide corridor centered on the departure runway is searched for vortices immediately following each aircraft departure. This may be accomplished with a column of ground-based microphones 3B-1 located along the centerline 3B-2 of the departure runway 3B-3 with a spacing 3B-4 of approximately 500 feet, as shown in FIG. 3B, each microphone providing at least ±200 feet of coverage on either side of the center line. A 10 microphone line, for example, would run along the center line for a distance of approximately 4500 feet long. The first microphone 3B-5 in line may be located at a preselected distance 3B-6, which maybe about 1000 feet, from the departure threshold 3B-7.

Refer once again to FIG. 3. As previously stated, the signal generated by each microphone in the microphone line 3-1 is coupled to a low pass filter 3-2 wherein an analog low pass filter sharply attenuates frequencies above 200 Hz. The filtered analog signal is converted to digital format at a 500 Hz rate. The digital signal at the output terminal of low pass filter 3-2 is coupled to a matched filter 3-4, wherein the microphone signal passes through a digital filter 3-4 approximately matched to a typical vortex infrasound spectra below 20 Hz and sharply attenuates sound above 20 Hz. The matched filter output is magnitude detected and smoothed over 1 to 2 seconds. It should be recognized that the 200 Hz and 20 Hz frequencies, the 500 Hz conversion rate, and the 1 to 2 seconds smoothing time are given as examples and that other appropriate frequencies, conversion rate, and smoothing time may be chosen.

The signal from the microphone 3B-5 closest to the departure threshold 3B-7 is compared in the engine noise threshold detector 3-3 to a predetermined threshold that is set to be exceeded only by noise from an aircraft passing directly over the microphone. When the threshold is exceeded, the signal coupled from the engine noise detector 3-3 opens gate 3-5, which automatically closes three minutes after it is opened. Opening the gate 3-5 activates the matched filter 3-4, the threshold computer 3-7, and the display 3-8. If another aircraft is detected before the 3 minutes have passed, gate 3-5 stays open until three minutes have elapsed from the time the second aircraft was detected.

Vortex detector 3-6 and the threshold computer 3-7 are coupled to receive the output signals from the matched filter 3-4. Vortex detector 3-6 continuously compares the magnitude of each signal to an ambient wind threshold which may be computed by threshold computer 3-7 from the infrasound generated by the ambient wind. The computation of the ambient wind threshold may be accomplished by averaging the ambient wind infrasound magnitudes coupled from the matched filter 3-4 for each of the two microphones 3B-8,3B-9 furthermost from the departure threshold 3B-7 during, for example, a 10 second time period that starts each time the gate 3-5 is triggered open and during which wake vortices have not yet been generated. It should be recognized, however, that a suitable fixed threshold for the vortex detector 3-6 may also be employed.

When display 3-8 is activated by gate 3-5, signals from the vortex detector 3-6 having magnitudes that exceed the second threshold are coupled to the display 3-8. As stated previously, the screen of the display 3-8 has a graph-like appearance. Microphone positions along the runway are located along the bottom of the display. A vertical bar appears above each microphone position, the height of which is proportional to the corresponding measured infrasound magnitude. During takeoff, the display shows the location of a departing aircraft as it accelerates down the runway. This is accomplished automatically since aircraft generated infrasound is coupled by successive microphones through the low pass filter 3-2, the matched filter 3-4, and the vortex detector 3-6 to the display unit 3-8 as the aircraft makes it run down the runway until liftoff. Following liftoff, bar heights reveal the presence of wake vortices along the runway. When all bar heights remain below a predetermined level for a predetermined time, the departure corridor is deemed free of hazardous vortices.

Microbursts: Microbursts hazardous to aircraft on approach are detected by a predetermined number of parallel rows of microphones 4A-1, 4A-2, 4A-n, each of which may contain 3 microphones, that may be positioned perpendicular to and centered on the foot print 4A-2 of the arrival glide slope 4A-3, as shown in FIG. 4A. The outboard microphone of each row is positioned at a distance 4A-4, which may be 500 feet, away from the runway centerline 4A-5 and the rows separated apart by a distance 4A-6 which may be 1500 feet. The microphones are similar to those described earlier. For departing aircraft, parallel rows of microphones, each of which may contain 3 microphones, may be spaced 1500 feet apart along the departure runway continuing into the region beyond the end of the departure runway. The parallel rows of microphones are each centered on the runway center line and the extended runway center line.

Figure 4:
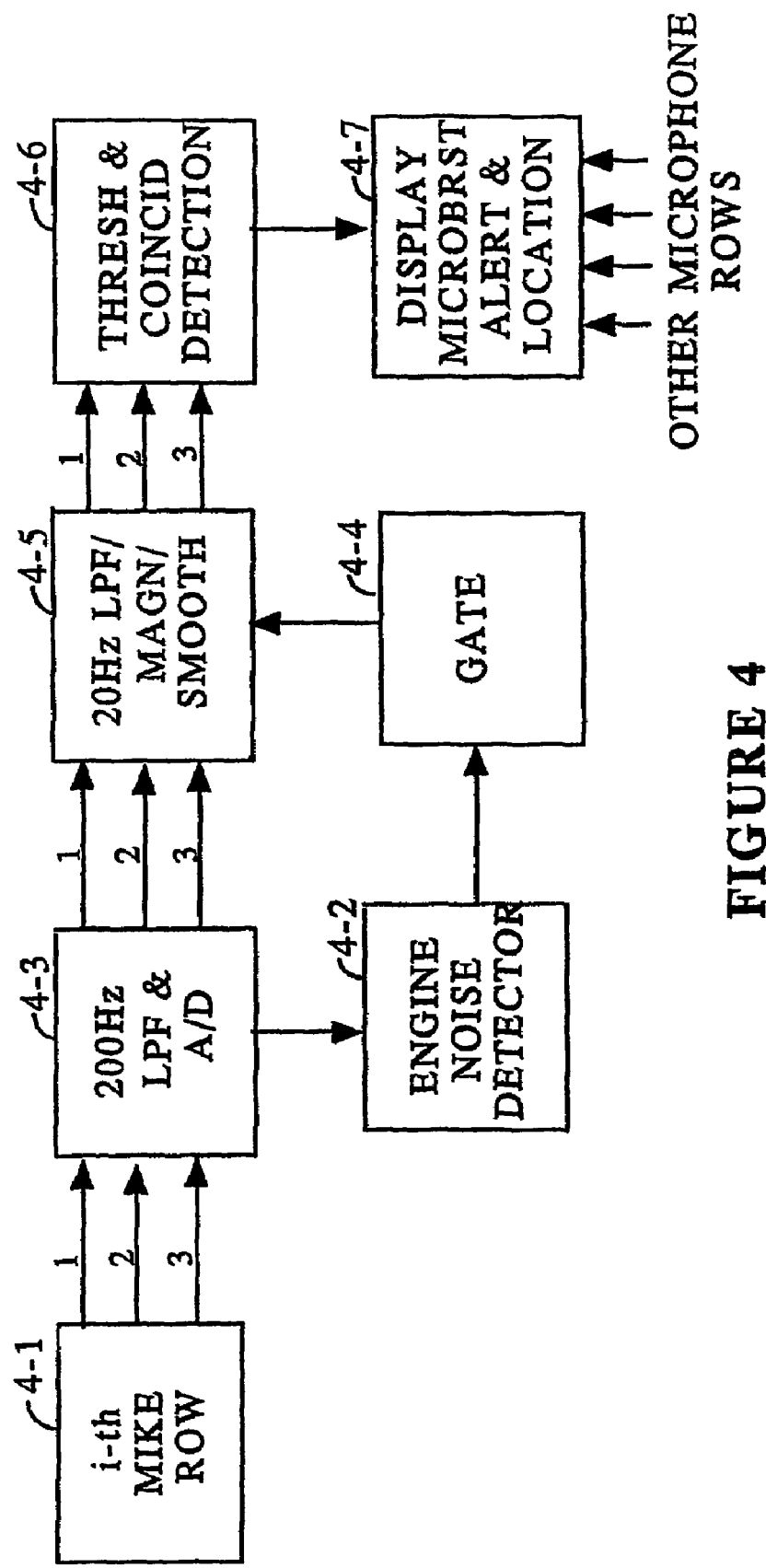
FIG. 4 is a block diagram of a preferred embodiment of the invention for ground-based detection and location of microbursts in the vicinity of airports.
Figure 4A:
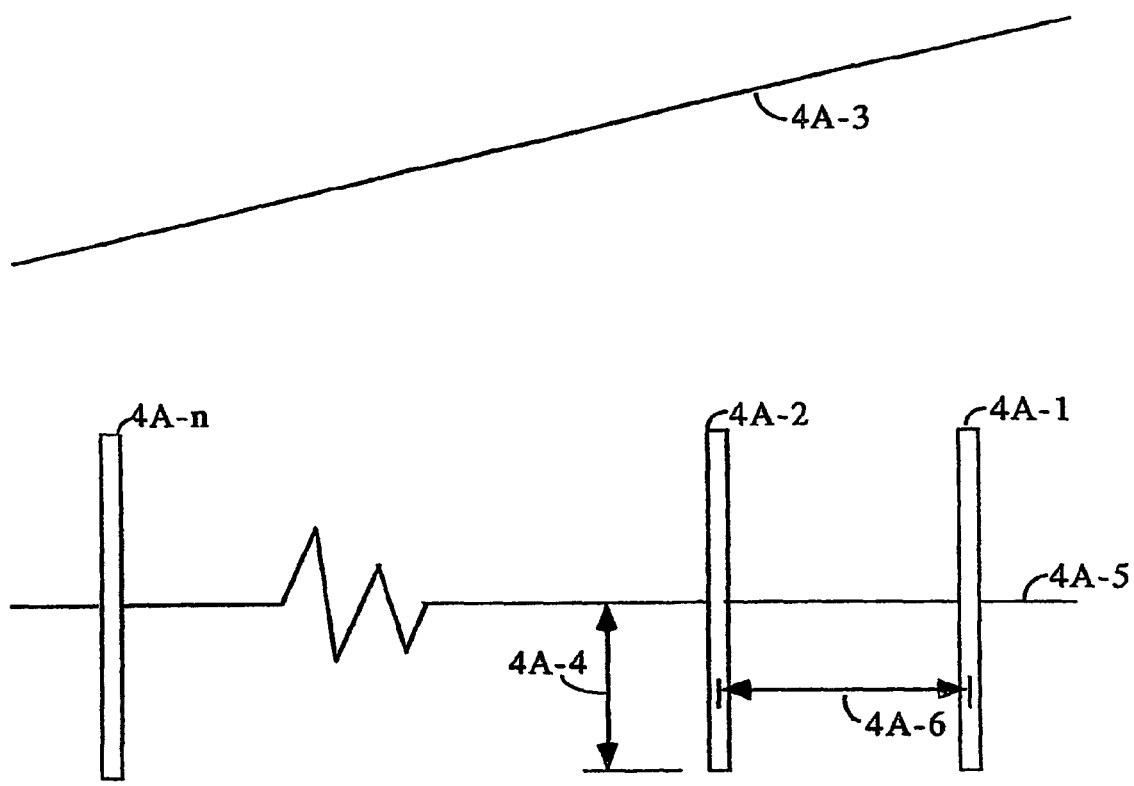
FIG. 4A is a diagram indicating the positioning of parallel rows of microphones centered on the foot print of an arrival glide slope.

Referring to FIG. 4, signals from each of the microphones, which may number 3, in the $i^{th}$ row of microphones 4-1, in the parallel rows of microphones shown in FIG. 4A, are coupled to a low pass filter and A/D converter 4-3 wherein an analog low pass filter sharply attenuates frequencies above a selected frequency, for example 200 Hz, and converts the resulting analog signal to a digital format at a rate, which for example may be a 500 Hz rate, that satisfies the Nyquist criteria. The output signals from low pass filter 4-3 are coupled to an engine noise threshold detector 4-2 and to an infrasound low pass filter 4-5, wherein each digital signal passes through a digital filter that sharply attenuates sound above a predetermined frequency, which for example may be 20 Hz, is magnitude detected, and smoothed over 1 to 2 seconds, for example, to reduce sound spikes from wind gusts. Signals provided at the output of the low pass filter 4-5 are, respectively, representative of the infrasound magnitude in the vicinity of each microphone.

The digitized signal amplitude from the center microphone is compared to a preselected threshold in the engine noise detector 4-2 that is exceeded only by noise from an aircraft passing directly overhead. When this threshold is exceeded, engine noise detector 4-2 closes gate 4-4, deactivating the infrasound low pass filter 4-5. When aircraft noise falls below the threshold set in engine noise detector 4-2, gate 4-4 opens and signals from the infrasound low pass filter 4-5 are coupled to a coincidence detector 4-6, wherein each representative microphone signal magnitude is compared to a predetermined threshold having a value corresponding to the sound magnitude generated by, for example, a 44 knot ambient wind.

When signals from all microphone representative signals exceed the predetermined threshold for predetermined time, which may be 30 seconds or more, a signal is coupled from the coincidence detector 4-6 to a microburst alert display unit 4-7, whereon the location of all microphones receiving infrasound that exceed the threshold set in the coincidence detector 4-6 are displayed on a map of the airport glide slopes.

Tornadoes: A tornado some distance away is detected when its radiated infrasound arriving at a microphone exceeds a predetermined threshold. Infrasound sensitive microphones similar to those described earlier may be used. Because cost is important, however, for this application, low cost electric microphones similar to Panasonic WM-034B may be used. Tests of these microphones show high pass 3 dB points between 0.5 and 0.8 Hz.

The SPL of infrasound emitted by a tornado having 120 knot internal winds is conservatively estimated to be 138 dB. For a tornado with a diameter of 0.2 miles close to the ground, spreading loss reduces this value to an infrasound SPL of 98 dB ten miles away, $(138 - 10 \log[10/0.1]^2)$dB. A tornado sensing threshold based on this value, for example, corresponds to a 24 minute warning of a tornado travelling 25 miles per hour towards the microphone. Based on the previous description of sound generated by turbulent flows, a tornado's spectrum is expected to peak below 5 Hz. For the detection of tornadoes, two embodiments will be described: The first has simpler signal processing, while the second has a lower false alarm rate. Both embodiments provide tornado warning in excess of 20 minutes and also predict the time for a tornado to arrive at the microphone location.

Figure 5A:
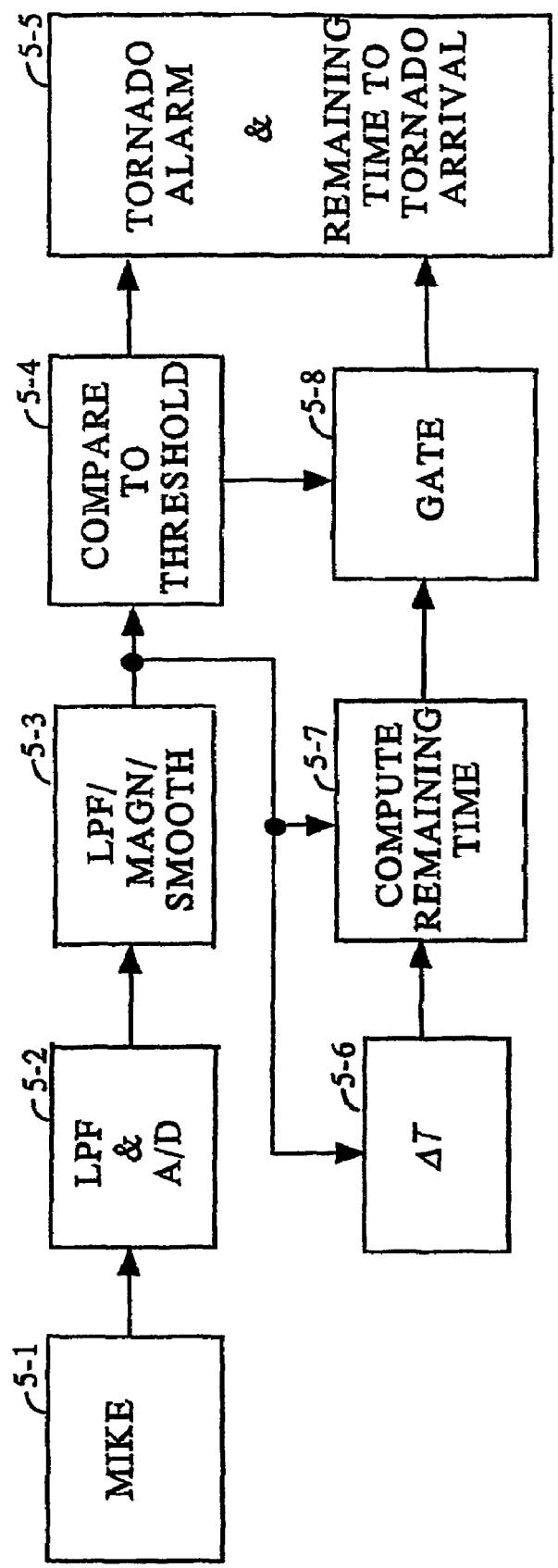
FIGS. 5A and 5B are block diagrams of preferred embodiments of the invention for ground-based detection of tornadoes and for prediction of the time for a tornado to arrive at the sensing site.

Refer now to FIG. 5A. A signal generated by a microphone 5-1 receiving infrasound from a tornado is coupled to a low pass filter and analog to digital converter 5-2 wherein the analog signal from the microphone is filtered in an analog low pass filter to attenuate frequencies above 100 Hz, for example, and converted to digital format at a 400 Hz rate. Signals at the output of lowpass filter 5-2 are coupled to a low pass filter/magnitude computer/smoother 5-3 wherein the digital signals are: (i) sharply filtered to attenuate frequencies above 20 Hz, (ii) the magnitudes of the digital signals are computed, and (iii) the computed magnitudes smoothed over 5 seconds, for example. This smoothing reduces sound spikes generated by wind gusts.

Signals resulting from the processing in the low pass filter/amplitude computer/smoother 5-3 are coupled to a comparator 5-4, a time delay unit 5-6, and time to arrival computer 5-7. Comparator 5-4 compares the magnitude of the signal coupled from the low pass filter/magnitude computer/smoother 5-3 to a predetermined threshold. When the threshold is exceeded for 30 seconds or more, for example, a signal from the comparator 5-4 is coupled to open a gate 5-8 and to activate a tornado alarm and display 5-5.

The digitized data stream from the low pass filter/magnitude smoother of 5-3 is delayed in the time delay unit 5-6 by a time $\Delta T$ that is of the order of 15 seconds, for example. The time delayed data stream is then coupled to the time to arrival computer 5-7. Using the delayed and undelayed data streams, the time to arrival computer 5-7 performs calculations to predict the time to arrival of the tornado at the microphone site. Updated predictions are continuously coupled to display 5-5 while gate 5-8 is open. Time to arrival predictions may be provided with the use of the formula derived below. Let V denote the component of tornado speed towards the microphone site. Let $M_i$ represent the magnitude of sound sensed by the microphone at time $t_i$, and $x_i$ represent the distance of the tornado from the microphone site at time $t_i$. Then, by the inverse square law dependence of signal on distance, $[M_{i+1}/M_i]=[x_i/x_{i+1}]^2$. Also $[x_i-x_{i+1}]=V[t_{i+1}-t_i]=V \Delta T$. Setting $r_{i+1}=[M_{i+1}/M_i]^{1/2}$, $x_i=[r_{i+1}x_{i+1}]$. Substituting and solving results in $[x_{i+1}/V]=\Delta T/[r_{i+1}-1]$. $[x_{i+1}/V]$ is the predicted remaining time for the tornado to arrive at the microphone site calculated at time $t_{i+1}$. The predicted time is a positive number when $r_{i-1}-1$ is greater than 1. If a tornado bypasses the microphone site, the value of $r_{i+1}-1$ becomes less than 1 and the predicted time is a negative number, in which case display 5-5 indicates that the tornado has passed.

Figure 5B:
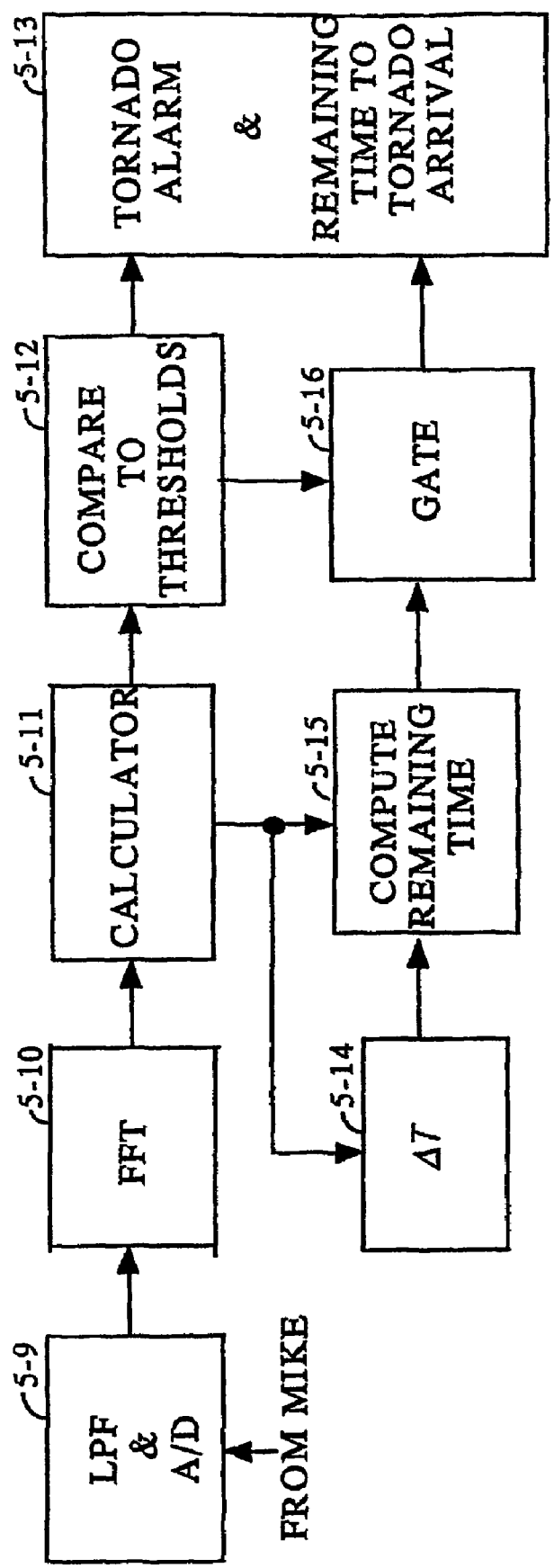

Refer now to FIG. 5B. Signals generated by the microphone are coupled to an analog low pass filter and analog to digital converter 5-9 wherein frequencies below 100 Hz, for example, are converted to digital format at a 500 Hz rate. The digital signals at the output of the low pass filter and analog to digital converter 5-9 are coupled to a fast Fourier transform (FFT) unit 5-10 wherein a 4096 point FFT is performed that is repeated every second. Based on a 500 Hz ND sampling rate, the waveform processed by the FFT algorithm each second is 8 seconds long. Only the outputs of frequency bins up through 15 Hz are retained. The FFT frequency resolution is about 0.12 Hz. The FET 5-10 output is coupled to a calculator 5-11 wherein the mean frequency, the 6 dB bandwidth, and the rms amplitude of the FFT bins within the 6 dB bandwidth are calculated. These three computed quantities are coupled to a comparator 5-12 which determines whether the following three conditions are simultaneously satisfied over a period of 30 seconds: (1) the calculated rms bin amplitude within the 6 dB bandwidth is greater than a predetermined value, (2) the calculated mean frequency is less than a predetermined value, and (3) the calculated 6 dB bandwidth is greater than a predetermined value. When the preceding conditions are met, the comparator 5-12 provides a signal to open a gate 5-16 which activates the tornado alarm and display 5-13.

The data stream of calculated rms bin amplitudes is also coupled from the calculator 5-11 to a time delay unit 5-14 and to remaining time computer 5-15. The time delay unit 5-14 delays the data stream by a time $\Delta T$ which may be in the order of 15 seconds and couples the time delayed data stream to the remaining time computer 5-15. Using the delayed and undelayed data streams, the remaining time computer 5-15 calculates the 'time remaining' before the tornado arrives at the microphone site using the formula derived above. Updated 'time remaining' predictions are coupled to a display 5-13, while gate 5-16 is open, whereon tornado alarms and remaining times to tornado arrivals are shown.

Tornado warning sensors may be installed in private residences and public buildings. The tornado warning can be both visual and audible. In the case of a residence, the tornado warning may be coupled into existing home security systems.

Clear Air Turbulence: To detect clear turbulence (CAT) from an aircraft, microphones, which may be two, are mounted outside the aircraft on opposite sides of the aircraft body near its front end. Infrasound arriving at the two microphones is utilized to detect CAT some distance away and measure CAT range and direction relative to the aircraft boresight (nose-on direction). The microphones may be similar to B&K Surface Microphone Type 4948 which are designed for exterior aircraft mounting. This microphone's extremely flat shape minimizes wind noise. The microphone detects signals down to below 1 Hz and is insensitive to vibration. A unity gain preamplifier integrated with the microphone converts the microphone's high output impedance to a low impedance capable of driving long signal cables.

A five-minute warning of approaching CAT onboard an aircraft allows for: (1) an orderly suspension of cabin service, (2) the buckling of passengers and flight crew into their seats, and (3) a precautionary reduction in aircraft speed. For an aircraft traveling at Mach 0.8, a five-minute warning corresponds to detecting CAT 40 miles away.

It has been shown that the total aerodynamic sound power generated by a free flow is proportional to $\rho v^3 M^5 l^2$, where $\rho$ is air density, v is flow velocity, M is flow Mach number, and $l^2$ is surface area. Since M is proportional to flow velocity v, the formula shows that aerodynamic sound power is proportional to the eighth power of the flow velocity. It is also known that CAT is produced by flows between 100 and 200 knots (50 to 100 m/s). Extrapolating from the sound emitted by a 37 mph atmospheric wind on top of Mount Washington surface shown in FIG. 1, the estimated SPL in the 1-14 Hz band for this wind speed is about 99 dB. This estimate is reduced by 6 dB to 93 dB to account for enhancement of aerodynamic wind sound generated near the ground (ground interaction). For a 37 mph surface wind speed, $\rho=1.293\times10^{-3}$ g/cm$^3$, v $=16.3\times10^2$ cm/s, c$=3.3\times10^4$ cm/s, and M=v /c=0.049. It follows from the free flow proportionality relation that CAT infrasound generated by an assumed 120 knot wind flow at 30,000 feet is conservatively 135.9 dB SPL, where $\rho=4.593\times10^{-4}$ g/cm$^3$, v $=60\times10^2$ cm/s, c$=3\times10^4$ cm/s, M=v /c=0.2. For a 2000 foot high CAT flow, CAT infrasound is estimated to extend down to below 1 Hz.

The SPL power $P_y$ of sound arriving at an aircraft a distance y away from the center of a CAT flow of width D, that radiates an SPL of $P_L$, is given by the following formula:

$$P_y = [P_L + 10 \log|1 - M \cos \theta|^{-5} + 10 \log(D/|y|)^2] dB$$

where: $\theta$ is the angle of the observation point relative to the direction of the CAT flow.

From the above, $P_L$ is 135.9 dB SPL. For a Mach 0.2 CAT flow (120 knots), the amplitude of the second term varies from +4.8 dB to −4 dB as a function of $\theta$. A value of −4 dB is conservatively assumed. The third term quantifies sound spreading loss. For an aircraft 40 miles away from the center of a CAT flow 10 miles wide, the third term is $10 \log(10/40)^2 = -12$ dB in which case $P_y \cong (135.9-4-12)=119.9$ dB.

The above CAT SPL generates a microphone signal that is significantly greater than microphone self noise. It will now shown that CAT infrasound arriving at the microphones is much greater than that generated by the aircraft. Table 1 shows spectra over octave bands of aircraft noise radiated by a military jet aircraft at 1600 feet altitude measured by the University of Kansas. These measurements are 10 dB higher than comparable measurements made by the inventor on commercial jet aircraft arriving at JFK airport.

TABLE 1

Jet Aircraft Noise

| Octave Band | SPL at 1600 feet |
|---|---|
| 45-89 | 97 dB |
| 89-177 | 98 |
| 177-353 | 97 |
| 353-707 | 96 |
| 707-1414 | 93 |
| 1414-2828 | 89 |
| 2828-5657 | 82 |
| 5657-11314 | 75 |
| Total SPL | 104 dB |

The two principal sources of aircraft noise are jet exhaust noise and fan/compressor machinery noise. The microphones mounted external to the aircraft are insensitive to frame coupled aircraft vibration. Aircraft generated sound is predominantly produced by jet flow behind the aircraft.

When the sum of the aircraft's forward speed Mach number and the jet exhaust backward speed Mach number is greater than one, jet flow noise does not reach the onboard microphones. This is generally the case for aircraft speeds greater than Mach 0.65.

In the case of a Mach 0.6 aircraft with a Mach 0.3 jet exhaust, jet flow noise at the microphones is attenuated by (10.2+5.7)=15.9 dB. The first number is due to forward aircraft speed and the second is due to backward jet flow speed, which were computed using the previously given formula: 10 $\log|1-M \cos \theta|^{-5}$. Jet noise emanates principally from a location about 100 feet behind the aircraft engines, which in turn are about 50 feet behind the sensing microphones. The SPL of jet flow noise arriving at the microphones in the infrasound band is obtained by first conservatively assuming that the SPL in the 45-89 Hz octave band in Table 1 is the same in lower octave bands. Second, jet noise is 100 feet behind the engines and when the microphones are positioned approximately 50 feet in front of the engines the SPL in each of the lower octave bands is increased by $10 \log(1600/150)^2 = 20.6$ dB to account for the shorter distance traveled by the sound to the microphones and then subtracting an attenuation factor of 15.9 dB, resulting in a net increase of 4.7 dB in each octave band. With these assumptions, the total SPL of jet flow noise at the microphones in the combined 3-6 Hz, 6-12 Hz and the 12-24 Hz bands is (97+4.7+4.8) dB or 106.5 dB, which is conservatively 13.4 dB lower than the CAT SPL.

For an aircraft travelling in a 40 knot ambient wind at 30,000 feet, the SPL of sound radiated by the ambient wind is (81.7-6)dB. The 6 dB reduction accounts for the absence of wind sound enhancement produced by wind flow adjacent to the ground. The ambient wind SPL sensed by the onboard microphones varies from this value by 10 $\log|1-M \cos \theta|^{-5}$ where $\theta$ is the angle of aircraft travel relative to the direction of the wind. For the above example, the SPL varies with wind direction from +1.5 dB to −1.4 dB. This variation is smoothed out by the 360 degree sound acceptance angle of each microphone. Combining all of the above, a 40 knot ambient wind generates an SPL about 39 dB lower than the CAT SPL.

The Doppler effect produced by forward aircraft motion transforms each arriving sound frequency f into Ff, where F=(1+M cos $\theta$), M is aircraft Mach number, and $\theta$ is the direction of sound arrival relative to the direction of aircraft travel. The amplitude of sound at each Doppler transformed frequency is multiplied by the same factor. Since ambient wind sound arrives at the microphones from all directions, the frequency and amplitude Doppler effects on the sensed ambient wind sound average out.

For the case in which CAT sound arrives in the aircraft's forward hemisphere, the value of F varies between 1 and 1.8 for a Mach 0.8 aircraft. For F=1.8, a CAT sound spectral peak around 0.5 Hz, for example, is transformed into 0.9 Hz with a 2.6 dB SPL increase. Thus, the Doppler effect introduces a relatively small spectral shift and increases CAT infrasound detectability.

Figure 6:
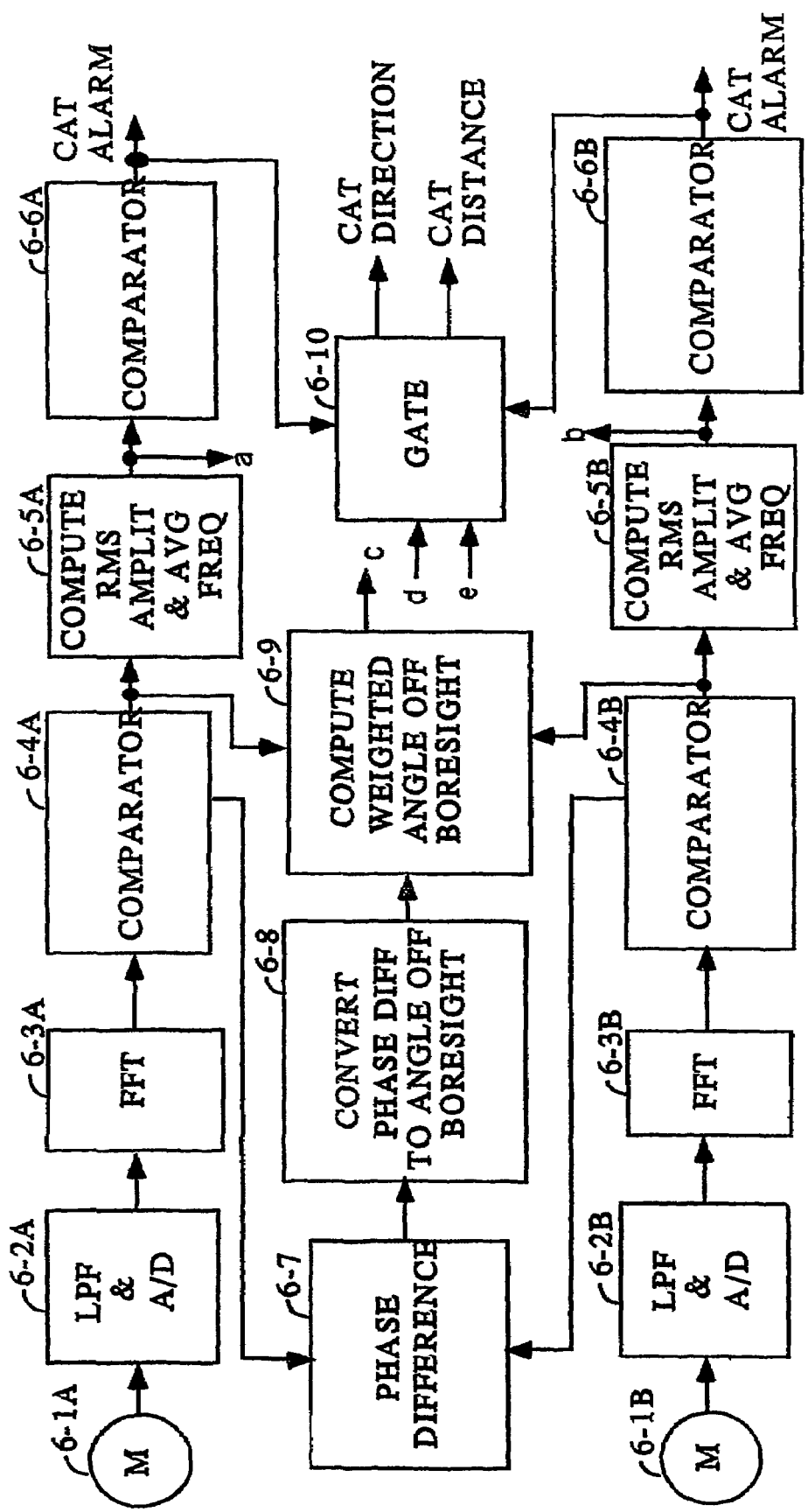
FIGS. 6 and 7 are block diagrams of a preferred embodiment of the invention for early detection of CAT from an aircraft at high altitudes, the determination of CAT direction and distance from the aircraft, and the detection of microbursts from an aircraft on final approach.

Refer now to FIG. 6. Signals from microphones positioned on an aircraft 6-1A and 6-1B are coupled, respectively, to low pass filters and analog to digital converters 6-2A and 6-2B where they are (1) analog low pass filtered to eliminate signals above 100 Hz, for example, (2) sampled at a 2048 Hz rate, for example, which satisfies the Nyquist sampling criterion, and (3) converted to digital format. The digitized signals are coupled from the filters and converters 6-2A and 6-2B, respectively, to FFT units 6-3A and 6-3B, each of which may perform a 2048 point Fast Fourier Transform (FFT) every second. FFT output bin frequencies may be spaced 1 Hz apart. Only the outputs from FFT bins having frequencies in the 1 to 25 Hz band are retained, though other bands may be utilized.

FFT bin amplitudes $\alpha_f$ and FFT bin phases $\alpha_f$ for frequencies in the 1-25 Hz band are coupled from the FFT unit 6-3A to a comparator 6-4A, along with their frequency identification. Similarly, FFT bin amplitudes and phases in the 1-25 Hz band are coupled from FFT unit 6-3B to comparator 6-4B, along with their frequency identification. Comparator 6-4A compares each bin amplitude $\alpha_f$ to a predetermined threshold. When a bin amplitude is less than the threshold, the bin's amplitude and the corresponding bin phase are eliminated from the retained set of FFT bin outputs. This eliminates signal outputs from bins having low S/N. Comparator 6-4B performs a similar operation.

Comparator 6-4A couples retained bin amplitudes $\alpha_f$ with their bin frequency identification to a rms amplitude and average frequency computer 6-5A and to a weighted angle off boresight computer 6-9, and also couples corresponding FFT bin phases $\alpha_f$ with their bin frequency identification to a phase difference computer 6-7. Similarly, comparator 6-4B couples retained bin amplitudes to a rms amplitude and average frequency computer 6-5B and to the weighted angle off boresight computer 6-9, and corresponding FFT bin phases to the phase difference computer 6-7. Rms amplitude and average frequency computer 6-5A calculates (1) the rms sum of retained bin amplitudes, denoted by A, and (2) the bin amplitude weighted mean frequency, denoted by $F_A$. Rms amplitude and average frequency computer 6-5B performs likewise, generating rms sum B and mean frequency $F_B$. Amplitude A and frequency $F_A$ are coupled to a second comparator 6-6A. Amplitude A is also coupled to rms averager 7-1 in FIG. 7. Similarly, amplitude B and frequency $F_B$ are coupled to comparator 6-6B. Amplitude B is also coupled to the rms averager 7-1 in FIG. 7.

When signals coupled from FFT units 6-3A and 6-3B to comparators 6-4A,6-4B exceed the predetermined thresholds, the frequencies $F_A$ and $F_B$ established, respectively, by the computers 6-5A and 6-5B are measures of the largest scale eddies in the turbulence generating the detected sound. Should hazardous CAT not be present, the rms sum and the average frequency determined in each microphone channel are representative of the ambient wind. For this case, bin amplitudes provided by the FFT units will be lower than the predetermined thresholds and will not be coupled to the rms amplitude and average frequency computers. As an aircraft approaches a CAT region, the FFT bin amplitudes will shift from that characterizing ambient wind towards amplitudes that characterize CAT and the processing described above will continue. The FFT bin amplitudes will effectively reach the CAT amplitudes when the received CAT SPL is about 6 dB greater than the ambient wind SPL.

As the aircraft approaches closer to the CAT region, the rms sum in each channel will continue to increase. Comparators 6-6A compares the measured mean frequencies coupled from the computer 6-5A to a predetermined threshold frequency, which may be set at approximately 5 Hz. If the mean frequency falls below the threshold frequency, comparator 6-6A then compares the rms sum to a predetermined amplitude threshold. If the sum exceeds the threshold, a CAT alarm is sounded in channel A. 6-6B performs similarly. When a CAT alarm is set off in both channels, gate 6-10 opens.

As mentioned above, comparators 6-4A and 6-4B each couple retained bin phase values to the phase difference determinator 6-7 with their corresponding bin frequency identification. Phase difference determinator 6-7 computes the electrical phase difference $\Phi_f$ between each pair of retained phase values having the same frequency identification, when both phase values are present. Electrical phase differences $\Phi_f$ and associated bin frequency identifications are coupled to a converter 6-8 wherein the phase difference is converted to the angle off boresight of the CAT sound arrival. For an assumed microphone separation of 10 feet, the maximum value of $\Phi_f$ for any frequency up to 25 Hz is less than 30 electrical degrees (at 30,000 feet). Each electrical phase difference $\Phi_f$ is converted to an estimate of CAT sound arrival angle $\theta_f$ (measured from aircraft boresight) using the following formula: $\theta_f = \cos^{-1}(\Phi_f c_a / 2\pi f D)$, where $c_a$ is the speed of sound at aircraft altitude, f is frequency, and D is the horizontal separation between the two microphones.

Arrival angle estimates $\theta_f$ are coupled from the converter 6-8 to a weighted angle off boresight computer 6-9 to which each corresponding identifying frequency is also coupled. Computer 6-9 also receives from each of comparator 6-4A and 6-4B retained bin signal amplitudes $\alpha_{fA}$ and $\alpha_{fB}$, respectively. Computer 6-9 calculates the average of $\alpha_{fA}$ and $\alpha_{fB}$, denoted by $A_f$, for each retained frequency and then calculates a signal strength weighted estimate of the arrival angle, denoted by $\theta$, using the following formula: $\theta = \Sigma A_f \theta_f / \Sigma A_f$. Because the microphones have no directivity, the computed value of $\theta$ is ambiguous. Depending on whether the sound was received in the forward or back hemisphere, the correct value is either $\theta$ or $[180-\theta]$, respectively. This ambiguity is resolved by the processing indicated in FIG. 7, with reference to the geometry shown in FIG. 8.

Referring FIGS. 7 and 8, an aircraft is shown at position 1 when a CAT alarm is announced in both microphone channels, and at position 2 at a time $\Delta T$ seconds later. The aircraft travels a distance X between the two positions at an aircraft ground speed of V nots, so that $X=V \Delta T$. Position 1 is a distance $R_1$ from the CAT region at which time the rms sum signal of the bin signal amplitudes at the computer 6-5A is $A_1$ and the rms sum signal of the bin signal amplitudes at the computer 6-5B is $B_1$. $A_1$ and $B_1$ are coupled to computer 7-1 wherein the square root of the average of $A_1$ and $B_1$ is determined. Position 2 is a distance $R_2$ from the CAT region at which time the rms signals coupled to computer 7-1 from the comparators 6-5A and 6-5B are $A_2$ and $B_2$, respectively. Since $X<<R_1$, the vectors $R_1$ and $R_2$ are substantially parallel, consequently the difference between the two ranges may be given as $R_1 - R_2 = X \cos \theta$ Designating the average of $A_1$ and $B_1$ by sig1 and the average of $A_2$ and $B_2$ by sig2, due to the non-uniform nature of the CAT region boundary, the following inverse square law relation holds only for $X<<R_1$: $r=[sig2/sig1]^{1/2}=[R_1/R_2]$. The preceding two equations relating $R_1$ to $R_2$ can be solved to yield $R_2 = [V \Delta T \cos \theta]/r-1]$. As may be seen from FIG. 8, the value r will lie between a value somewhat less than 1 and a value greater than 1.

Figure 7:
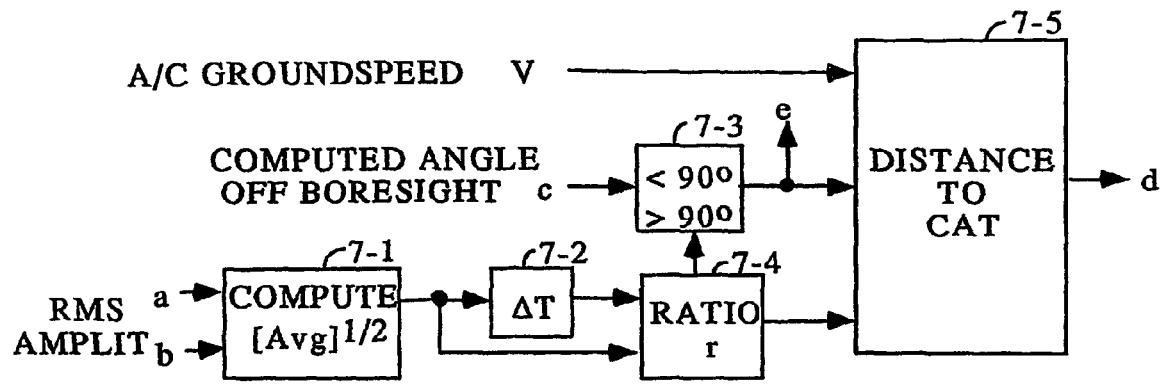
Figure 8:
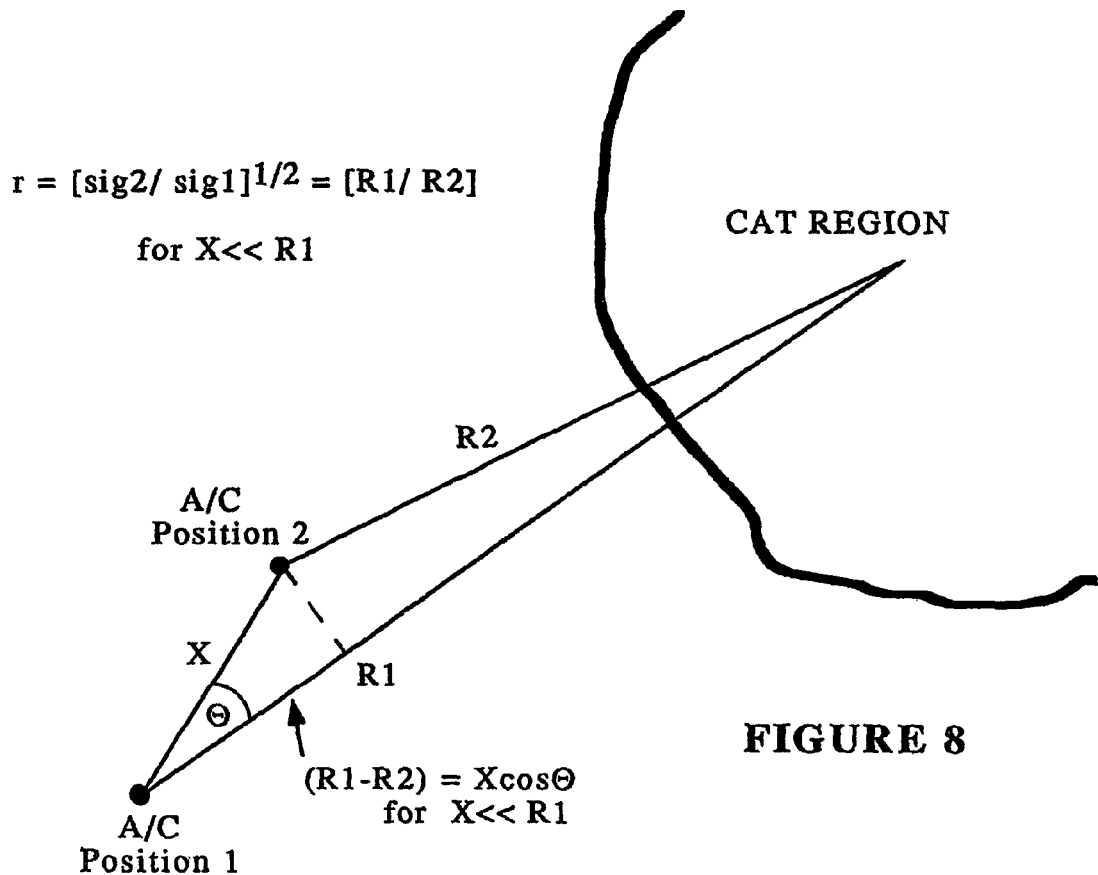
FIG. 8 is a representation of relative positions of CAT and an aircraft, and is useful for the determination of range from the aircraft to the CAT region and the direction from the aircraft to the CAT region.

Referring to FIGS. 6 and 7, instantaneous sound arrival angle $\theta$ is coupled from computer 6-9 to quadrant detector 7-3 wherein it is determined if $\theta$ is less or greater than 90°. Instantaneous rms amplitudes $A_j$ and $B_i$ are coupled from computers 6-5A and 6-5B, respectively, to a square root computer 7-1 wherein the average of the two values is determined and the square root of the average value is taken. This square root quantity is coupled from the square root computer to a time delay unit 7-2 and a ratio detector 7-4. Time delay unit 7-2 time delays the values coupled from the square root computer 7-1 by $\Delta T$ and couples the delayed values to a ratio detector 7-4. Ratio detector 7-4 computes the instantaneous ratio r of each delayed square root value to the corresponding undelayed square root value. The ratio r is coupled from the ratio detector 7-4 to the quadrant detector 7-3. When r>1, quadrant detector 7-3 couples θ to a distance to CAT computer 7-5 and to the gate 6-10. Instantaneous aircraft ground speed V obtained from onboard instrumentation is also coupled to the distance to CAT computer 7-5, which utilizes the values of V, r, ΔT, and θ to compute the distance $R_2$ from the formula $R_2 = [V \Delta T \cos \theta]/r-1]$. The values of $R_2$ and θ are coupled through gate 6-10, when open, to provide updated distances and angles to CAT to display units. When r<1, the quadrant detector 7-3 calculates [180−θ] and couples this value to the distance to CAT computer 7-5 and to the gate 6-10. The distance to CAT computer 7-5 then calculates $R_2$ using the value [180−θ] and couples this result to the gate 6-10. As a result the range and angle to CAT are coupled through gate 6-10 to provides updated distances and unambiguous boresight angles to the CAT region while gate 6-10 remains open.

When the aircraft is traveling almost parallel to the region, |θ| will be close to 90° in which case the distance to CAT region will change very slowly, giving inaccurate results for computed distance to the CAT region. Hence, when |r−1| is equal to or less than 0.05, the distance prediction previously displayed is not updated until |r−1| exceeds 0.05.

The embodiment for detecting CAT and measuring distance and direction to a CAT region may also be utilized onboard an aircraft to detect microbursts during final approach and to measure the distance and direction to the microburst region. Since microburst wind speeds are lower than CAT flow speeds, the radiated aerodynamic sound intensity will be smaller, resulting in shorter microburst detection ranges. Aircraft landing speeds, however, are approximately one third of the speeds at high altitude, so that microburst warning times may be only slightly less than CAT warning times.

It should be recognized that frequencies, times, and other parameters mentioned in the description of the preferred embodiments are given by way of example, whether or not so specified, and that other such values may be used to provide the desired results.

While the invention has been described in its preferred embodiments, it is to be understood that the words which have been used are words of description rather than of limitation and frequencies, times, and other parameters are given by way of example, whether or not so specified. Thus the scope of the invention is determined by the appended claims and that changes may be made within the purview thereof without departure from the true scope and spirit of the invention in its broader aspects.

I claim:

1. A method for detecting atmospheric disturbances including the steps of:
    providing infrasound frequency magnitudes of received noise spectra;
    comparing said infrasound frequency magnitudes to an infrasound threshold; and
    determining existence of said atmospheric disturbances with the utilization of infrasound frequency magnitudes that exceed said threshold.

2. A method for detecting atmospheric disturbances in accordance with claim 1 wherein said providing step includes the steps of;
    extracting noise at frequencies below a specified frequency from said received noise spectra to provide an extracted noise spectra;
    filtering said extracted noise spectra to obtain infrasound at frequencies below a predetermined infrasound frequency; and
    detecting magnitudes of infrasound frequencies below said predetermined infrasound frequency.

3. A method for detecting atmospheric disturbances in accordance with claim 2 wherein said extracting step includes the step of activating said filtering step when magnitudes of said extracted noise spectra exceed a preselected threshold.

4. A method for detecting atmospheric disturbances in accordance with claim 3 wherein said comparing step includes the steps of:
    coupling infrasound obtained in said filtering step to an atmospheric disturbance detector and to a threshold computer;
    computing a threshold in said threshold computer by averaging magnitudes of infrasound received prior to reception of infrasound generated by an atmospheric disturbance; and
    coupling said computed threshold to said atmospheric disturbance detector.

5. A method for detecting atmospheric disturbances in accordance with claim 4 wherein said detecting step includes the step of establishing an existence of an atmospheric disturbance when infrasound coupled to said atmospheric disturbance detector exceeds said computed threshold.

6. A method for detecting atmospheric disturbances in accordance with claim 5 wherein said providing step further includes the step of positioning sound sensors in a manner to sense sound from a noise generating source and providing infrasound magnitudes respectively associated with said sensors.

7. A method for detecting atmospheric disturbances in accordance with claim 6 wherein said sound sensors are positioned in a row perpendicular to a foot print of a glide slope of an approaching aircraft with predetermined spacings therebetween.

8. A method for detecting atmospheric disturbances in accordance with claim 7 wherein said row of sound sensors is placed at a runway middle marker.

9. A method for detecting atmospheric disturbances in accordance with claim 7 further including the step of comparing extracted noise of a preselected sound sensor in said row of sound sensors to said preselected threshold.

10. A method for detecting atmospheric disturbances in accordance with claim 6 wherein said positioning step includes the step of locating parallel rows of sound sensors, each containing a multiplicity of said sound sensors, between runways at an airport.

11. A method for detecting atmospheric disturbances in accordance with claim 6 wherein said positioning step includes the step of locating a column of said sound sensors, with predetermined spacings therebetween, along a center line of an airport runway, a first sound sensor of said column being placed at a predetermined location.

12. A method for detecting atmospheric disturbances in accordance with claim 11 wherein said extracted noise is obtained from noise spectra received by at least one sound sensor including said first.

13. A method for detecting atmospheric disturbances in accordance with claim 12 wherein said filtering step and said detecting step are performed in sound sensors subsequent to said at least one sound sensor, said filtering step being activated by said extracted noise obtained from noise spectra received at said at least one sound sensor.

14. A method for detecting atmospheric disturbances including the steps of:

sensing atmospheric noise to obtain noise signals;
filtering said noise signals to eliminate signals at frequencies above a predetermined frequency and providing signals at frequencies within a band of frequencies below said predetermined frequency;
comparing amplitudes of signals at frequencies in said band below said predetermined frequency to a first preselected threshold;
determining a representative amplitude and representative frequency for signals at frequencies in said band below said predetermined frequency that have amplitudes which exceed said first preselected threshold;
comparing said representative frequency to a predetermined frequency threshold;
comparing said representative amplitude to a second preselected threshold when said representative frequency exceeds said predetermined frequency threshold; and
indicating when said representative amplitude exceeds said second preselected threshold.

15. The method of claim 14 wherein said filtering step includes the step of placing signals having frequencies within said band of frequencies in frequency bins and determining amplitudes and phases of signals in each bin.

16. The method of claim 15 wherein said amplitude comparing step includes the step of comparing said amplitudes of signals in each of said frequency bins to said first preselected threshold.

17. The method of claim 14 wherein: said sensing step includes the step of
providing first and second sensors to obtain first and second noise signals, respectively;
said filtering step includes the steps of
establishing a first band of signals having frequencies below said predetermined frequency in said first noise signal and a second band of signals having frequencies below said predetermined frequency in said second noise signal; and
utilizing said first and second bands of signals to estimate an angle off a reference of said atmospheric disturbance and to estimate a range to said atmospheric disturbance.

18. The method of claim 17 wherein said utilizing step includes the steps of:
computing electrical phase differences between signals in said first band and signals in said second band; and
converting said electrical phase differences to said angle off said reference.

19. The method of claim 18 wherein said computing step computes phase differences between signals in said first band and signals in said second having equal frequencies.

20. The method of claim 17 wherein said establishing step includes the steps of:
placing signals having frequencies within said first band into first frequency bins and determining phases and amplitudes of signals in each of said first frequency bins;
placing signals having frequencies within said second band into second frequency bins and determining phases and amplitudes of signals in each of said second frequency bins.

21. The method of claim 20 further including the steps of:
determining phases differences between signals in bins of said first band and signals in corresponding bins of said second band, a bin in said first band and a corresponding bin in said second band comprising a bin set, thereby obtaining a bin set phase difference for each of said bin sets; and
utilizing said bin set phase differences to estimate an angle of said atmospheric disturbance from a reference direction.

22. The method of claim 21 wherein said utilizing step includes the steps of:
averaging signal amplitudes in bins of said first band with signal amplitudes in corresponding bins of said second band, to obtain a bin set average amplitude for each set of corresponding bins;
multiplying bin set average amplitudes by said bin set phase differences, respectively, to obtain set products of bin phase multiplied by bin average amplitude;
summing said set products over all bin sets, to obtain a sum of set products;
summing said set average amplitudes over all bin sets to obtain a sum of set average amplitudes; and
dividing said sum of set products by said sum of average amplitudes to obtain said estimate of said angle.

23. The method of claim 20 wherein said comparing amplitudes step includes the step of
comparing amplitudes of signals in said first band and amplitudes of signals in said second band to said first preselected threshold and removing signals from bins, in said first and second bands, with amplitudes that do not exceed said first preselected threshold; and further including the steps of:
combining amplitudes of signals in said first and second bands that exceed said first preselected threshold at a first location, to obtain a first combined amplitude signal and combining amplitudes of signals in said first and second bands that exceed said first preselected threshold at a second location, to obtain a second combined amplitude signal; using said first and second combined amplitude signals to estimate range to said atmospheric disturbance.

24. The method of claim 23 wherein said combining includes the steps of:
computing rms sum of signal amplitudes at said first location in said first and second frequency bins to obtain rms sum signals $A_1$, and $B_1$, respectively; and
computing rms sum of signal amplitudes at said second location in said first and second frequency bins to obtain rms sum signals $A_2$ and $B_2$, respectively.

25. The method of claim 24 wherein said using step includes the steps of:
averaging $A_1$ and $B_1$ to obtain an average signal $S_1$, and averaging $A_2$ and $B_2$ to obtain an average signal $S_2$;
forming a ratio $r=S_1/S_2$;
noting a difference in position of said first location and said second location, said difference in position being $X \cos \theta$, where X is a distance from said first location to said second location and $\theta$ is said angle off said reference; and
estimating range R to said atmospheric disturbance from $R=X \cos \theta/(r-1)$.

26. A method for detecting atmospheric disturbances in accordance with claim 1 wherein said providing step includes the steps of:
extracting noise at frequencies below a specified frequency from said received noise spectra to provide an extracted noise spectra;
filtering said extracted noise spectra through a low pass filter to obtain infrasound at frequencies below a predetermined infrasound frequency; and
comparing magnitudes of said infrasound at frequencies below said predetermined infrasound frequency to a preselected magnitude.

27. A method for detecting atmospheric disturbances in accordance with claim 26 wherein said preselected magnitude is that of a preselected wind velocity.

28. A method for detecting atmospheric disturbances in accordance with claim 26 further including the steps of:
   selecting a signal in said extracted noise spectra, thereby providing a selected signal;
   comparing said selected signal to a second predetermined threshold; and
   deactivating said low pass filter when said signal exceeds said second predetermined threshold.

29. A method for detecting atmospheric disturbances in accordance with claim 26 wherein said providing step further includes the step of positioning sound sensors in a plurality of parallel rows positioned perpendicular to and centered on a foot print of an aircraft arrival glide slope.

30. A method for detecting atmospheric disturbances in accordance with claim 29 wherein each row contains at least 3 sensors.

31. A method for detecting atmospheric disturbances in accordance with claim 1 wherein said providing step includes the steps:
   obtaining infrasound below a predetermined infrasound frequency, thereby providing extracted infrasound; and
   detecting magnitudes of said extracted infrasound.

32. A method for detecting atmospheric disturbances in accordance with claim 31 wherein said obtaining step includes the steps of:
   extracting noise at frequencies below a specified frequency from said received noise spectra to provide an extracted noise spectra; and
   filtering said extracted noise spectra to obtain said extracted infrasound.

33. A method for detecting atmospheric disturbances in accordance with claim 31 wherein said providing step includes the step of positioning a noise sensor and said determining step includes the steps of:
   delaying extracted infrasound for a predetermined time interval, thereby providing delayed extracted infrasound;
   predicting a time of arrival at said noise sensor of an atmospheric disturbance causing a presently extracted infrasound with the utilization of said delayed extracted infrasound and said presently extracted infrasound.

34. A method for detecting atmospheric disturbances in accordance with claim 33 wherein said predicting step includes the steps of:
   determining magnitudes of said delayed extracted infrasound and said presently extracted infrasound;
   establishing a ratio of said magnitudes;
   providing a square root of said ratio; and
   utilizing said square root, said time delay, and velocity of said infrasound to predict said time of arrival.

35. A method for detecting atmospheric disturbances in accordance with claim 33 further including the steps of:
   producing a signal when magnitudes of said extracted infrasound exceed said infrasound threshold for a predetermined time interval;
   coupling said signal to a gate to which said time of arrival is also coupled; and
   supplying said time of arrival through said gate when said signal is received.

36. A method for detecting atmospheric disturbances in accordance with claim 32 wherein said filtering step provides infrasound signals at frequencies below a preselected infrasound frequency and said determining step includes the steps of:
   finding a bandwidth of said infrasound signals having amplitudes greater than a preselected amplitude;
   calculating a mean frequency and rms amplitude for signals within said bandwidth;
   comparing said bandwidth, said mean frequency, and said rms amplitude to respective predetermined thresholds; and
   providing an alarm when said respective thresholds are simultaneously exceeded over a specified time interval.

* * * * *